(12) United States Patent
Kumar et al.

(10) Patent No.: US 12,359,584 B1
(45) Date of Patent: Jul. 15, 2025

(54) ACOUSTIC ENGINE CASING FOR GAS TURBINE ENGINE

(71) Applicant: HONEYWELL INTERNATIONAL INC., Charlotte, NC (US)

(72) Inventors: Shailesh Kumar, Bangalore (IN); Jyotichandra Jingade, Bangalore (IN); Mohammed Qizar, Hyderabad (IN); Mahmoud Mansour, Phoenix, AZ (US); Michael Barton, Phoenix, AZ (US); William Schuster, Phoenix, AZ (US); John Gunaraj, Phoenix, AZ (US); David Hanson, Phoenix, AZ (US); Swarna Sinha Srinath, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/403,157

(22) Filed: Jan. 3, 2024

(51) Int. Cl.
| F01D 11/08 | (2006.01) |
| F01D 25/04 | (2006.01) |
| F01D 25/24 | (2006.01) |
| F02C 7/24 | (2006.01) |

(52) U.S. Cl.
CPC .............. *F01D 11/08* (2013.01); *F01D 25/04* (2013.01); *F01D 25/24* (2013.01); *F02C 7/24* (2013.01); *F05D 2220/32* (2013.01); *F05D 2240/14* (2013.01); *F05D 2260/96* (2013.01)

(58) Field of Classification Search
CPC ...... F01D 11/08; F01D 25/24; F05D 2260/96; F05D 2240/14
See application file for complete search history.

(56) References Cited

U.S. PATENT DOCUMENTS

| 5,282,718 A | 2/1994 | Koff et al. |
| 7,210,905 B2 | 5/2007 | Lapworth |
| 8,337,146 B2 | 12/2012 | Yu |
| 8,550,768 B2 | 10/2013 | Montgomery |

(Continued)

FOREIGN PATENT DOCUMENTS

EP 1013937 A2 6/2000

OTHER PUBLICATIONS

Sutliff, Daniel, et al., "Foam-Metal Liner Attenuation of Low-Speed Fan Noitce," NASA-TM—2008-215227, AIAA-2008-2897, Aug. 2008.

(Continued)

*Primary Examiner* — Courtney D Heinle
*Assistant Examiner* — John S Hunter, Jr.
(74) *Attorney, Agent, or Firm* — Lorenz & Kopf, LLP

(57) ABSTRACT

A gas turbine engine includes a rotatable component, and an engine casing disposed about the rotatable component. The engine casing includes a casing treatment having a plurality of grooves and a plurality of acoustic chambers. Each of the plurality of grooves is defined in the engine casing with a groove depth, and each of the plurality of acoustic chambers has an acoustic chamber depth based on the groove depth. Two of the plurality of grooves are associated with one of the plurality of acoustic chambers, one of the plurality of grooves is associated with a second one of the plurality of acoustic chambers, and the one of the plurality of acoustic chambers has an acoustic configuration that is different than the second one of the plurality of acoustic chambers.

17 Claims, 9 Drawing Sheets

(56) References Cited

U.S. PATENT DOCUMENTS

| | | | |
|---|---|---|---|
| 9,004,859 | B2 | 4/2015 | Shahpar et al. |
| 9,732,677 | B1* | 8/2017 | Chien ............... G10K 11/172 |
| 9,816,528 | B2* | 11/2017 | Johann ............... F04D 29/164 |
| 10,066,640 | B2 | 9/2018 | Bennington et al. |
| 11,098,731 | B2 | 8/2021 | Gentry et al. |
| 11,346,367 | B2 | 5/2022 | Yu et al. |
| 11,480,106 | B2* | 10/2022 | Morin ............... F02C 7/24 |
| 2015/0037142 | A1 | 2/2015 | Morel et al. |

OTHER PUBLICATIONS

Hughes, Christopher E., et al., "Effect of Two Advanced Noise Reduction Technologies on the Aerodynamic Performance of an Ultra High Bypass Ratio Fan," NASA/TM—2013-216073, Nov. 2013.

Bozak, Rick, et al., "The Aerodynamic Performance of an Over-the-Rotor Liner with Circumferential Grooves on a High Bypass Ratio Turbofan Rotor," Environmentally Responsible Aviation Project Integrated Systems Research Program, ASME Turbo Expo Jun. 2-7, 2013.

Bozak, Rick, et al., "W-8 Acoustic Casing Treatment Test Overview," Acoustics Technical Working Group NASA Langley Research Center, Apr. 11-12, 2017.

Gazella, Matthew R., et al. "Evaluating the Acoustic Benefits of Over-the-Rotor Acoustic Treatments Installed on the advanced Noise Control Fan."

Bozak, Richard F., et al., "Measurement of Noise Reduction from Acoustic Casing Treatments Installed Over a Subscale High Bypass Ratio Turbofan Rotor," 2018 AIAA Aviation Forum, Jun. 25-29, 2018.

Sutliff, Daniel L., "High-Speed Turbofan Noise Reduction Using Foam-Metal Liner Over-the Rotor," Downloaded by NASA Glenn Research Center on Aug. 16, 2013, http://arc.aiaa.org, DOI: 10.2514/1.C032021.

Hathaway, Michael D., "Self-Recirculating Casing Treatment Concept for Enhanced Compressor Performance," NASA/TM—2002-211569, ARL-TR-2748, GT-2002-30368, Jul. 2002.

Hathaway, Michael D., "Passive Endwall Treatments for Enhancing Stability," NASA/TM—2007-214409, ARL-TR-3878, Jul. 2007.

\* cited by examiner

ACOUSTIC ENGINE CASING FOR GAS TURBINE ENGINE

STATEMENT REGARDING FEDERALLY SPONSORED RESEARCH OR DEVELOPMENT

This invention was made with Government support under 693KA9-21-T-0004 awarded by the Federal Aviation Administration. The Government has certain rights in the invention.

TECHNICAL FIELD

The present disclosure generally relates to gas turbine engines, and more particularly relates to an acoustic engine casing for a gas turbine engine associated with an aerial vehicle.

BACKGROUND

Gas turbine engines may be employed to power various devices. For example, a gas turbine engine may be employed to power an aerial vehicle, such as an aircraft. Generally, gas turbine engines include systems with fan and compressor axial rotors, which are operable to draw air into the gas turbine engine and increase the static pressure of the gas flowing within the gas turbine engine. In certain instances, the fan may generate undesirable noise when in operation. In order to mitigate the noise, one or more treatments may be applied to the engine casing. These treatments, however, may adversely impact the aerodynamic performance of the fan.

Accordingly, it is desirable to provide an acoustic engine casing for a gas turbine engine, which reduces noise without substantially impacting aerodynamic performance of the fan. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

According to various embodiments, provided is a gas turbine engine. The gas turbine engine includes a rotatable component, and an engine casing disposed about the rotatable component. The engine casing includes a casing treatment having a plurality of grooves and a plurality of acoustic chambers. Each of the plurality of grooves is defined in the engine casing with a groove depth, and each of the plurality of acoustic chambers has an acoustic chamber depth based on the groove depth. Two of the plurality of grooves are associated with one of the plurality of acoustic chambers, one of the plurality of grooves is associated with a second one of the plurality of acoustic chambers, and the one of the plurality of acoustic chambers has an acoustic configuration that is different than the second one of the plurality of acoustic chambers. The groove depth of the two of the plurality of grooves is the same. The rotatable component includes an airfoil having a leading edge and a trailing edge, the plurality of grooves is defined to extend from at least proximate the leading edge to the trailing edge, and the two of the plurality of grooves are defined to be positioned between the leading edge and the trailing edge. The plurality of grooves includes a leading groove that terminates at the leading edge. The plurality of grooves includes a leading groove that has a portion that overlaps the leading edge. The plurality of grooves includes a trailing groove that has a portion that overlaps the trailing edge and a portion that extends axially from the trailing edge. The one of the plurality of acoustic chambers has a fir-tree acoustic configuration. The second one of the plurality of acoustic chambers has a rectangular cross-section. A plurality of perforations is defined between each of the plurality of grooves and the associated one of the plurality of acoustic chambers. A total depth of each of the plurality of grooves and the associated one of the plurality of acoustic chambers is substantially the same. The plurality of grooves includes at least a first groove, a second groove, a third groove, a fourth groove and a fifth groove arranged in a direction of working fluid flow through the rotatable component, each of the plurality of grooves has a width in the direction, and the width of the first groove is a minimum width, and the width of the fifth groove is a maximum width. The groove depth of the fifth groove is a maximum groove depth, and the groove depth of the first groove, the second groove and the third groove are the same. The groove depth of the first groove, the second groove and the third groove are a minimum groove depth. The width of each of the third groove and the fourth groove is the same and is different than the width of the second groove.

Further provided is a gas turbine engine. The gas turbine engine includes a rotatable component that has an airfoil having a leading edge and a trailing edge. The gas turbine engine includes an engine casing disposed about the rotatable component. The engine casing includes a casing treatment having a plurality of grooves and a plurality of acoustic chambers. Each of the plurality of grooves is defined in the engine casing with a groove depth, and each of the plurality of acoustic chambers has an acoustic chamber depth. A total depth of each of the plurality of grooves and the associated one of the plurality of acoustic chambers is substantially the same. A number of the plurality of acoustic chambers is less than a number of the plurality of grooves such that two of the plurality of grooves are associated with one of the plurality of acoustic chambers, and the two of the plurality of grooves are defined between the leading edge and the trailing edge.

The one of the plurality of acoustic chambers has an acoustic configuration that is different than a second one of the plurality of acoustic chambers. The plurality of grooves includes a leading groove that terminates at the leading edge. The plurality of grooves includes a leading groove that has a portion that overlaps the leading edge. The plurality of grooves includes a trailing groove that has a portion that overlaps the trailing edge and a portion that extends axially from the trailing edge. A plurality of perforations is defined between each of the plurality of grooves and the associated one of the plurality of acoustic chambers.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
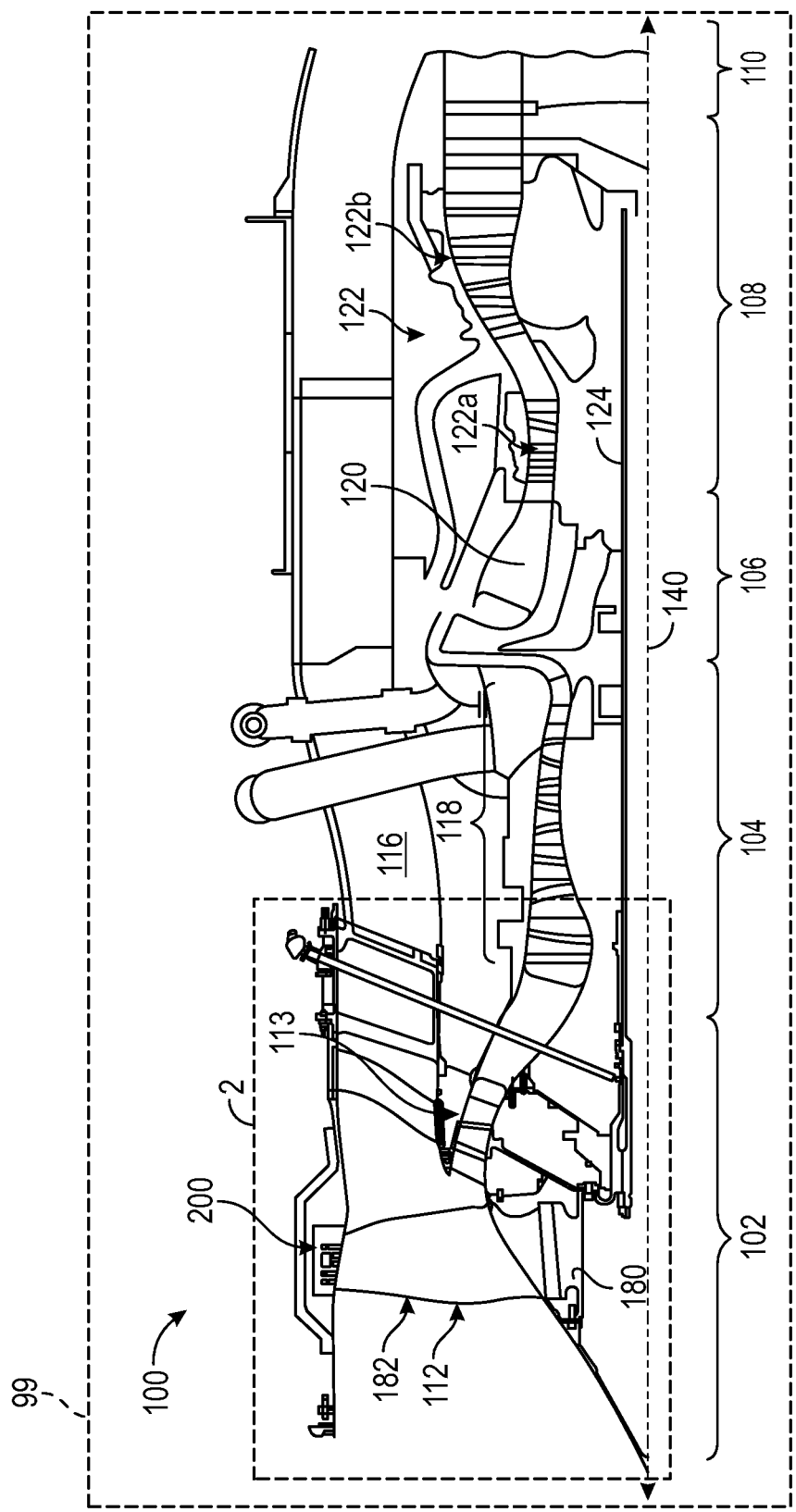
FIG. 1 is a schematic cross-sectional illustration of a gas turbine engine, which includes an exemplary acoustic engine casing in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of vehicle that would benefit from an acoustic engine casing, and the use of the acoustic engine casing for a gas turbine engine and an aerial vehicle described herein is merely one exemplary embodiment according to the present disclosure. In addition, while the acoustic engine casing is described herein as being used with a gas turbine engine onboard a vehicle, such as a bus, motorcycle, train, automobile, marine vessel, military vehicle, aircraft, rotorcraft, unmanned aircraft, and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a partial, cross-sectional view of an exemplary gas turbine engine 100 is shown with the remaining portion of the gas turbine engine 100 being generally axisymmetric about a longitudinal axis 140, which also comprises an axis of rotation or centerline for the rotating components in the gas turbine engine 100. In the depicted embodiment, the gas turbine engine 100 is an annular multi-spool turbofan gas turbine jet engine within an aircraft 99, although other arrangements and uses may be provided. As will be discussed herein, the gas turbine engine 100 includes an acoustic engine casing 200, which provides for reduced noise during operation of the gas turbine engine 100 without adversely impacting aerodynamic performance.

In this example, the gas turbine engine 100 includes a fan and booster section 102, a compressor section 104, a combustor section 106, a turbine section 108, and an exhaust section 110. In one example, the fan and booster section 102 includes a fan rotor 112, which draws air into the gas turbine engine 100 and accelerates it. A portion of the accelerated air exhausted from the fan rotor 112 is directed through an outer (or first) bypass duct 116 and the remaining portion of air exhausted from the fan rotor 112 is directed toward a booster rotor 113 and subsequently into the compressor section 104. The compressor section 104 includes one or more compressors 118. The number of compressors 118 in the compressor section 104 and the configuration thereof may vary. The one or more compressors 118 sequentially raise the pressure of the air and direct a majority of the high-pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 120, the high-pressure air is mixed with fuel, which is combusted. The high-temperature combustion air is directed into the turbine section 108. In this example, the turbine section 108 includes one or more turbines 122 disposed in axial flow series. In one example, the one or more turbines 122 may include one or more high pressure turbines 122a and one or more low pressure turbines 122b. It will be appreciated that the number of turbines, and/or the configurations thereof, may vary. The combustive gas expands through and rotates the turbines 122. The combustive gas flow then exits turbine section 108 for mixture with the cooler bypass airflow from the outer bypass duct 116 and is ultimately discharged from gas turbine engine 100 through exhaust section 110. As the turbines 122 rotate, each drives equipment in the gas turbine engine 100 via concentrically disposed shafts or spools.

Figure 2:
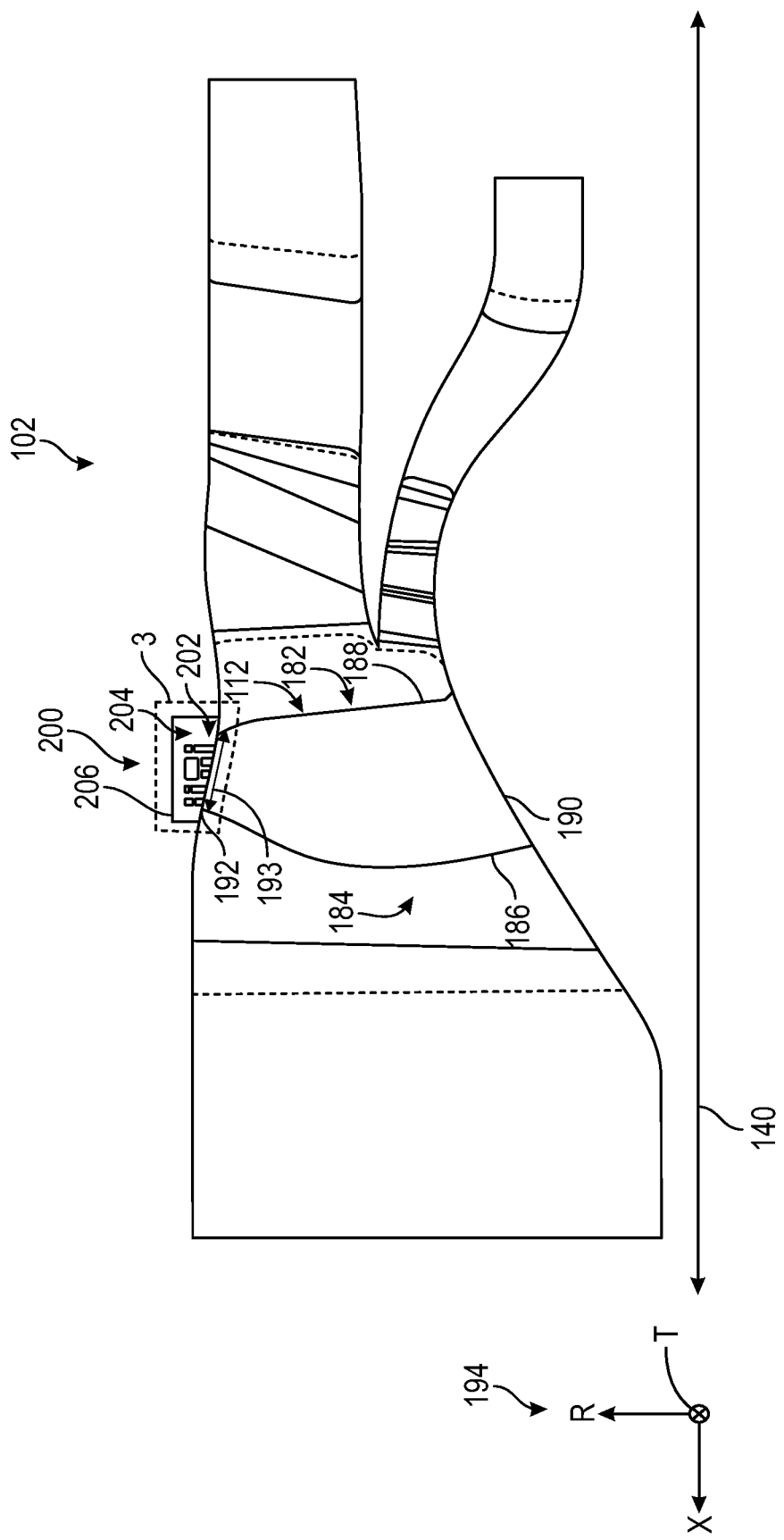
FIG. 2 is a detail cross-sectional view of the acoustic engine casing of FIG. 1, taken at 2 of FIG. 1, in accordance with the various embodiments of the present disclosure.

With reference to FIG. 2, a schematic meridional sectional view of the fan and booster section 102 is shown. In one example, the fan and booster section 102 includes the fan rotor 112 and the acoustic engine casing 200. As will be discussed, the acoustic engine casing 200 surrounds the fan rotor 112 and reduces noise during operation of the fan and booster section 102 (and the operation of the gas turbine engine 100). The fan rotor 112 includes a rotor disk 180 (FIG. 1) and in this example, a plurality of fan blades 182 that are spaced apart about a perimeter or circumference of the rotor disk 180. For ease of illustration, one of the plurality of fan blades 182 for use with the fan rotor 112 of the gas turbine engine 100 is shown. Each of the fan blades 182 may be referred to as an "airfoil 184." Each airfoil 184 extends in a radial direction (relative to the longitudinal axis 140 of the gas turbine engine 100) about the periphery of the rotor disk 180. The airfoils 184 each include a leading edge 186 in a direction of fluid flow through the gas turbine engine 100 (FIG. 1), an axially-opposed trailing edge 188, a base or root 190, and a radially-opposed tip 192. The leading edge 186 is spaced apart from the trailing edge 188 in a streamwise or chordwise direction, which generally corresponds to an axial direction. The leading edge 186 is defined at 0% chord, while the trailing edge 188 is at 100% chord. Generally, the tip 192 has a meridional tip chord length 193, which is about 8 inches (in.) to about 10 inches (in.). The tip 192 is spaced from the root 190 in a blade height, span or spanwise direction, which generally corresponds to a radial direction or R-axis of a coordinate legend 194 in the view of FIG. 2. Generally, the radial direction or R-axis of a coordinate legend 194 in the view of FIG. 2 is radially outward and orthogonal to the axial direction or X-axis, and the axial direction or X-axis is parallel to the longitudinal axis 140 or axis of rotation of the gas turbine engine 100. A tangential direction or T-axis is mutually orthogonal to the R-axis and the X-axis. Generally, the acoustic engine casing 200 reduces the noise associated with the operation of the fan and booster section 102 without substantially impacting aerodynamic performance of the fan and booster section 102. This ensures that a specific fuel consumption associated with the gas turbine engine 100 is not impacted by the inclusion of the acoustic engine casing 200.

In this example, the acoustic engine casing 200 includes a casing treatment 202 and an acoustic treatment 204, which are each defined in a shroud or housing 206 associated with the acoustic engine casing 200. In this example, the casing treatment 202 is positioned radially outboard of the fan blade 182, however, in other embodiments, the casing treatment 202 may have a different orientation. In this example, the casing treatment 202 is defined so as to extend in the radial direction, along an axis that is substantially perpendicular to the longitudinal axis 140 of the gas turbine engine 100. The acoustic treatment 204 is defined radially outboard of the casing treatment 202 and extends in the radial direction or along an axis that is substantially perpendicular to the longitudinal axis 140. In one example, the housing 206 is composed of metal or metal alloy, and the casing treatment 202 and the acoustic treatment 204 are each formed within the housing 206 via casting, machining, additive manufacturing, etc. The housing 206 is an annular strip, which is coupled to the acoustic engine casing 200 via press-fit, mechanical fasteners, etc. Generally, by forming the casing treatment 202 and the acoustic treatment 204 within the housing 206, manufacturing complexity associated with the acoustic engine casing 200 is reduced. It should be noted, however, in other embodiments, the casing treatment 202 and the acoustic treatment 204 may be formed directly in the acoustic engine casing 200, if desired.

Figure 3:
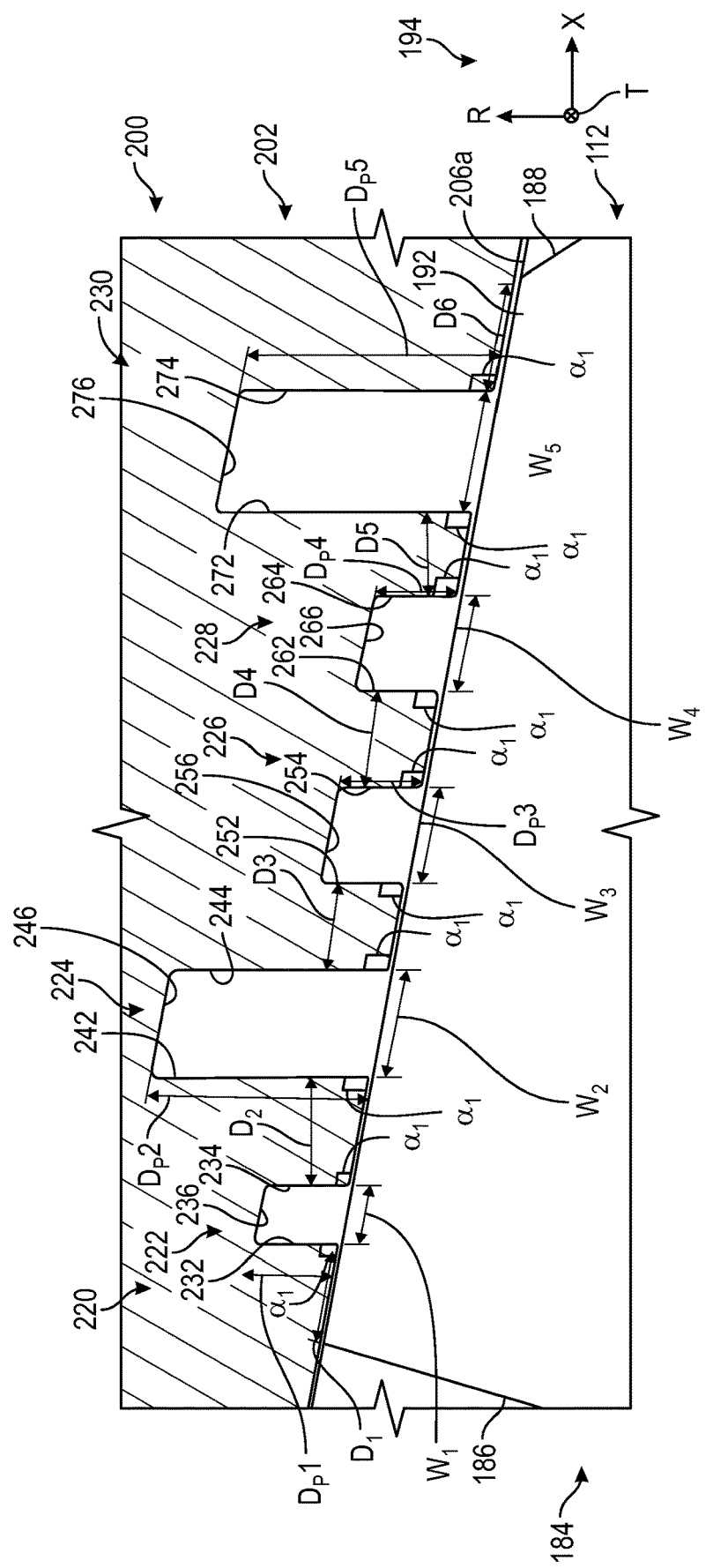
FIG. 3 is a detail view of a casing treatment associated with the acoustic engine casing of FIG. 1, in which an acoustic treatment and a housing are removed for clarity.

With reference to FIG. 3, the casing treatment 202 is shown in greater detail. In FIG. 3, the casing treatment 202 is shown with the acoustic treatment 204 and the housing 206 removed for clarity. In one example, the casing treatment 202 includes a plurality of casing grooves or grooves 220, which are defined in the housing 206 to extend about a perimeter or circumference of the housing 206. The grooves 220 are defined through an inner surface 206a of the housing 206 and extend radially or in the radial direction from the inner surface 206a. The grooves 220 are defined through the inner surface 206a so as to be proximate or adjacent to the tip 192 of the airfoil 184. Each of the grooves 220 has an inlet or opening defined at the inner surface 206a. In this example, the grooves 220 include a first groove 222, a second groove 224, a third groove 226, a fourth groove 228 and a fifth groove 230.

The first groove 222 is defined in the housing 206 so as to be proximate, adjacent to or spaced apart from the leading edge 186 of the airfoil 184. In one example, the first groove 222 is spaced a distance D1 apart from the leading edge 186. The distance D1 is about 0.29 inches (in.) such that the first groove 222 is at about 10% chord. The first groove 222 has a first width W1, which is defined axially or in the X-direction. The first width W1 is about 50% of a fifth width W5 of the fifth groove 230. In this example, the first groove 222 is substantially U-shaped, and includes a first leading wall 232 opposite a first trailing wall 234. The first leading wall 232 and the first trailing wall 234 are interconnected by a first perforated wall 236. The first leading wall 232 is spaced apart from the first trailing wall 234 by the first width W1, and the first perforated wall 236 has the first width W1. The first leading wall 232 and the first trailing wall 234 are each defined to extend along an axis that is substantially perpendicular to the first perforated wall 236 and substantially parallel to the radial direction R. Stated another way, the first leading wall 232 and the first trailing wall 234 are defined at a first angle α1 relative to the inner surface 206a. In one example, the first angle α1 is substantially a right angle or is about 90 degrees. The first leading wall 232 and the first trailing wall 234 each extend for a first depth Dp1. In one example, the first depth Dp1 is about 33% of a fifth depth Dp5 of the fifth groove 230.

The second groove 224 is downstream of the first groove 222 in a direction of the fluid flowing through the fan rotor 112. The second groove 224 is spaced apart from the first groove 222 by a distance D2. In one example, the distance D2 is about 0.30 inches (in.) such that the second groove 224 is located at about 25% chord. The second groove 224 has a second width W2, which is defined axially or in the X-direction. The second width W2 is about 90% of the fifth width W5 of the fifth groove 230. In this example, the second groove 224 is substantially U-shaped, and includes a second leading wall 242 opposite a second trailing wall 244. The second leading wall 242 and the second trailing wall 244 are interconnected by a second perforated wall 246. The second leading wall 242 is spaced apart from the second trailing wall 244 by the second width W2, and the second perforated wall 246 has the second width W2. The second leading wall 242 and the second trailing wall 244 are each defined to extend along an axis that is substantially perpendicular to the second perforated wall 246 and substantially parallel to the radial direction R. Stated another way, the second leading wall 242 and the second trailing wall 244 are defined at the first angle α1 relative to the inner surface 206a. The second leading wall 242 and the second trailing wall 244 each extend for a second depth Dp2. In one example, the second depth Dp2 is about 33% of the fifth depth Dp5 of the fifth groove 230.

The third groove 226 is downstream of the second groove 224 in a direction of the fluid flowing through the fan rotor 112. The third groove 226 is spaced apart from the second groove 224 by a distance D3. In one example, the distance D3 is about 0.25 inches (in.) such that the third groove 226 is located at about 50% chord. The third groove 226 has a third width W3, which is defined axially or in the X-direction. The third width W3 is about 80% of the fifth width W5 of the fifth groove 230. In this example, the third groove 226 is substantially U-shaped, and includes a third leading wall 252 opposite a third trailing wall 254. The third leading wall 252 and the third trailing wall 254 are interconnected by a third perforated wall 256. The third leading wall 252 is spaced apart from the third trailing wall 254 by the third width W3, and the third perforated wall 256 has the third width W3. The third leading wall 252 and the third trailing wall 254 are each defined to extend along an axis that is substantially perpendicular to the third perforated wall 256 and substantially parallel to the radial direction R. Stated another way, the third leading wall 252 and the third trailing wall 254 are defined at the first angle α1 relative to the inner surface 206a. The third leading wall 252 and the third trailing wall 254 each extend for a third depth Dp3. In one example, the third depth Dp3 is about 33% of the fifth depth Dp5 of the fifth groove 230.

The fourth groove 228 is downstream of the third groove 226 in a direction of the fluid flowing through the fan rotor 112. The fourth groove 228 is spaced apart from the third groove 226 by a distance D4. In one example, the distance D4 is about 0.27 inches (in.) such that the fourth groove 228 is located at about 60% to about 65% chord. The fourth groove 228 has a fourth width W4, which is defined axially or in the X-direction. The fourth width W4 is about 80% of the fifth width W5 of the fifth groove 230. Thus, in this example, the fourth width W4 is the same as the third width W3. The fourth groove 228 is substantially U-shaped and includes a fourth leading wall 262 opposite a fourth trailing wall 264. The fourth leading wall 262 and the fourth trailing wall 264 are interconnected by a fourth perforated wall 266. The fourth leading wall 262 is spaced apart from the fourth trailing wall 264 by the fourth width W4, and the fourth perforated wall 266 has the fourth width W4. The fourth leading wall 262 and the fourth trailing wall 264 are each defined to extend along an axis that is substantially perpendicular to the fourth perforated wall 266 and substantially parallel to the radial direction R. Stated another way, the fourth leading wall 262 and the fourth trailing wall 264 are defined at the first angle α1 relative to the inner surface 206a. The fourth leading wall 262 and the fourth trailing wall 264 each extend for a fourth depth Dp4. In one example, the fourth depth Dp4 is about 33% of the fifth depth Dp5 of the fifth groove 230. Thus, in this example, the fourth depth Dp4 is the same as the third depth Dp3.

The fifth groove 230 is downstream of the fourth groove 228 in a direction of the fluid flowing through the fan rotor 112. The fifth groove 230 is spaced apart from the fourth groove 228 by a distance D5. In one example, the distance D5 is about 0.23 inches (in.) such that the fifth groove 230 is located at about 90% to 95% chord. The fifth groove 230 is defined between the fourth groove 228 and the trailing edge 188 of the airfoil 184. In one example, the fifth groove 230 is proximate, adjacent to and spaced a distance D6 apart from the trailing edge 188. In one example, the distance D6 is about 0.18 inches (in.). The fifth groove 230 has the fifth width W5, which is defined axially or in the X-direction. The fifth width W5 is a maximum width of the grooves 220, and in one example, is about 0.38 inches (in.). The fifth groove 230 is substantially U-shaped and includes a fifth leading wall 272 opposite a fifth trailing wall 274. The fifth leading wall 272 and the fifth trailing wall 274 are interconnected by a fifth perforated wall 276. The fifth leading wall 272 is spaced apart from the fifth trailing wall 274 by the fifth width W5, and the fifth perforated wall 276 has the fifth width W5. The fifth leading wall 272 and the fifth trailing wall 274 are each defined to extend along an axis that is substantially perpendicular to the fifth perforated wall 276 and substantially parallel to the radial direction R. Stated another way, the fifth leading wall 272 and the fifth trailing wall 274 are defined at the first angle α1 relative to the inner surface 206a. The fifth leading wall 272 and the fifth trailing wall 274 each extend for the fifth depth Dp5. The fifth depth Dp5 of the fifth groove 230 is a maximum depth of the grooves 220, and in one example, is about 0.77 inches (in.).

Each of the perforated walls 236, 246, 256, 266, 276 define a plurality of perforations. Generally, the perforated walls 236, 246, 256, 266, 276 can define any number of perforations having any desired size and shape. In one example, the perforated walls 236, 246, 256, 266, 276 each include a plurality of circular holes, which have an open area of about 3.0 percent to about 18 percent. It should be noted, however, that one or more of the perforated walls 236, 246, 256, 266, 276 can be composed of a fine wire mesh panel or screen, or a sintered wire material with or without a perforate backing. Thus, each of the perforated walls 236, 246, 256, 266, 276 can generally be considered a porous panel, in that each of the perforated walls 236, 246, 256, 266, 276 includes a plurality of perforations or openings (in the example of a wire mesh screen) through which the fluid flow may pass into the acoustic treatment 204.

Figure 4:
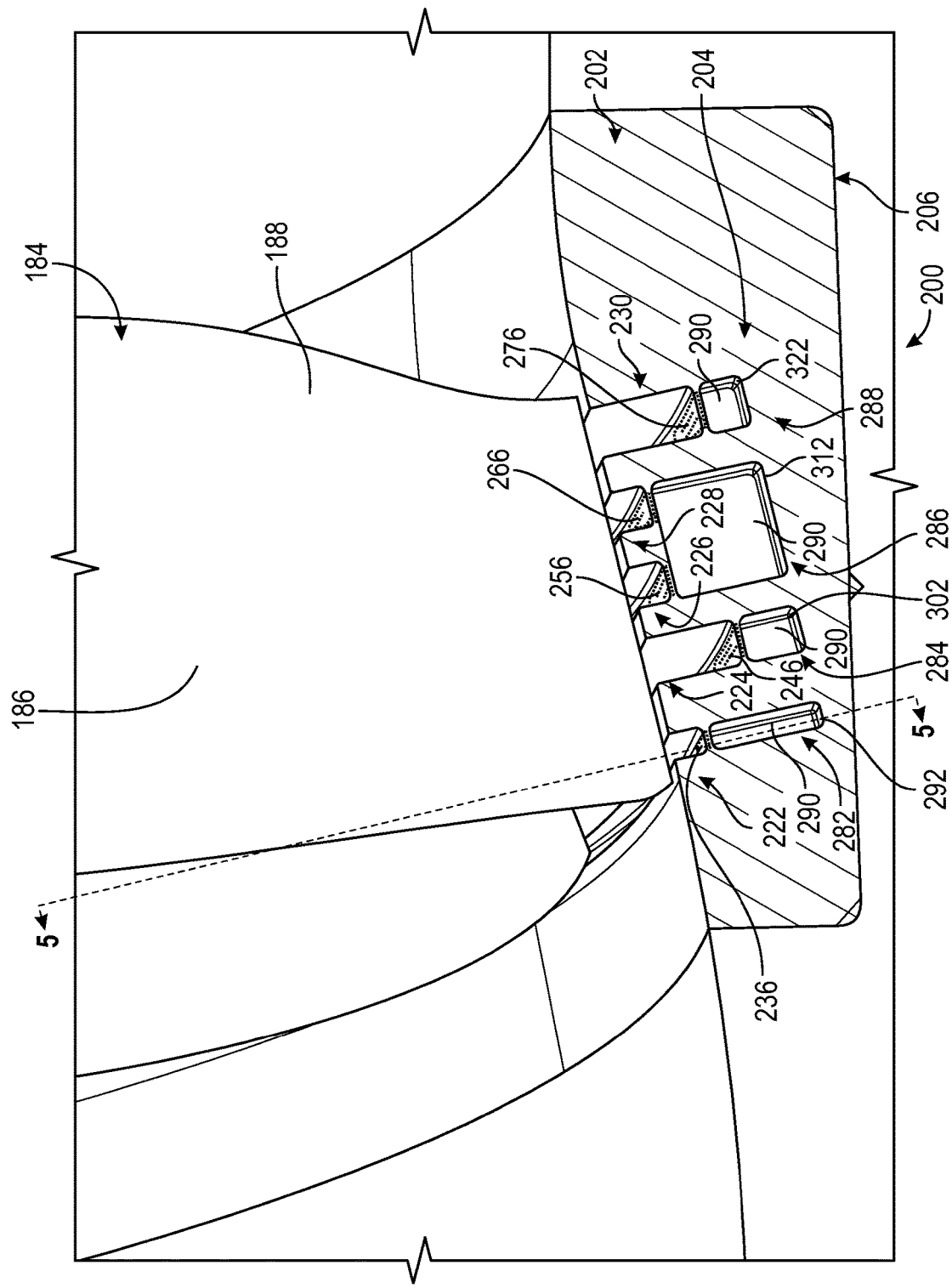
FIG. 4 is a detail cross-sectional view of the casing treatment and the acoustic treatment defined in the housing associated with the exemplary acoustic engine casing.

With reference to FIG. 4, the acoustic treatment 204 is fluidly coupled to the casing treatment 202 via the perforated walls 236, 246, 256, 266, 276. FIG. 4 is a perspective cross-sectional view of a portion of the airfoil 184 and the acoustic engine casing 200. In one example, the acoustic treatment 204 includes a plurality of acoustic chambers 280, which are defined in the housing 206. In this example, the acoustic chambers 280 include a first acoustic chamber 282, a second acoustic chamber 284, a third acoustic chamber 286 and a fourth acoustic chamber 288. The first acoustic chamber 282 is fluidly coupled to or in fluid communication with the first groove 222 via the first perforated wall 236. The second acoustic chamber 284 is fluidly coupled to or in fluid communication with the second groove 224 via the second perforated wall 246. The third acoustic chamber 286 is fluidly coupled to or in fluid communication with the third groove 226 and the fourth groove 228 via a respective one of the third perforated wall 256 and the fourth perforated wall 266. Thus, in this example, two of the grooves 220, the third groove 226 and the fourth groove 228, are in fluid communication with the same acoustic chamber or are in fluid communication with one or a single acoustic chamber, the third acoustic chamber 286. The fourth acoustic chamber 288 is fluidly coupled to or in fluid communication with the fifth groove 230 via the fifth perforated wall 276.

Figure 5:
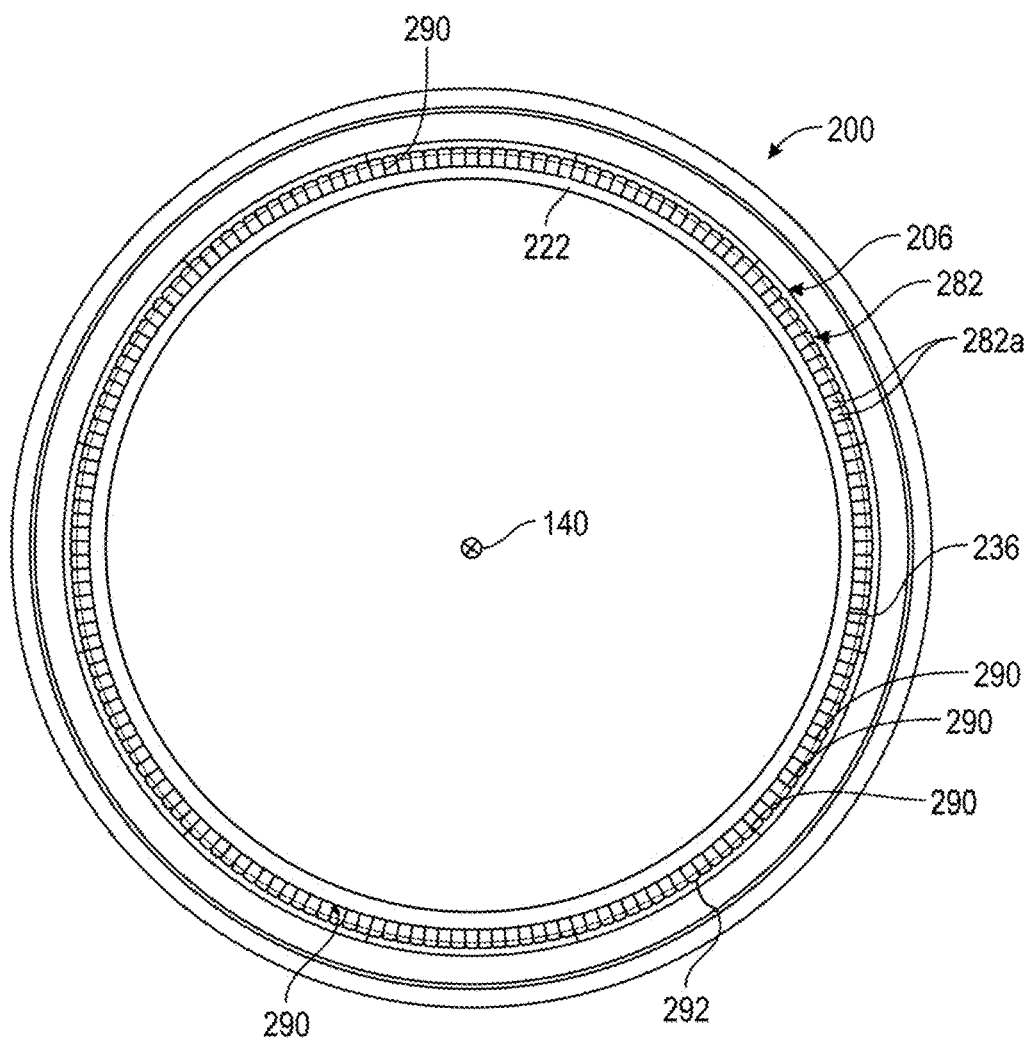
FIG. 5 is a cross-sectional view of the acoustic engine casing, taken from the perspective of line 5-5 of FIG. 4.

Generally, the acoustic chambers 280 are defined in the housing 206 so as to be partitioned about a perimeter or circumference of the housing 206. For example, with reference to FIG. 5, a cross-sectional view of the acoustic engine casing 200 is shown. As illustrated in FIG. 5, the casing treatment 202 extends substantially uniformly about the circumference of the housing 206 such that each of the grooves 220 are continuous about the circumference of the housing 206. The acoustic treatment 204 includes a plurality of partition walls 290 that divide each of the acoustic chambers 282, 284, 286, 288 into a plurality of discrete sub-chambers that are spaced apart about the perimeter or circumference of the housing 206 by a respective one of the partition walls 290. The partition walls 290 are spaced apart about the perimeter or circumference of the housing 206. Each of the partition walls 290 extend from the respective perforated walls 236, 246, 256, 266, 276 to a respective terminal wall 292, 302, 312, 322 of the respective acoustic chamber 282, 284, 286, 288. In the example of FIG. 5, the first groove 222 extends substantially uniformly or is continuous about the perimeter or circumference of the housing 206 and the acoustic engine casing 200. The first perforated wall 236 also extends substantially uniformly or is continuous about the perimeter or circumference of the housing 206 and the acoustic engine casing 200. The first acoustic chamber 282 is discontinuous about the perimeter or circumference of the housing 206 and the acoustic engine casing 200 as the partition walls 290 divide the first acoustic chamber 282 into a plurality of sub-chambers 282a. The partition walls 290 extend from the first perforated wall 236 to the first terminal wall 292 of the first acoustic chamber 282. By dividing the acoustic chambers 282, 284, 286, 288 into sub-chambers with the partition walls 290, acoustic performance of the acoustic treatment 204 is improved. Generally, the partition walls 290 ensure that the acoustic chambers 282, 284, 286, 288 are locally reacting so that the response of the casing treatment 202 is dependent on the local acoustic pressure. Without the partition walls 290, the acoustic pressure within the acoustic chambers 282, 284, 286, 288 may become nonuniform in the axial and circumferential directions, which may result in performance that is more difficult to predict and control.

Figure 6:
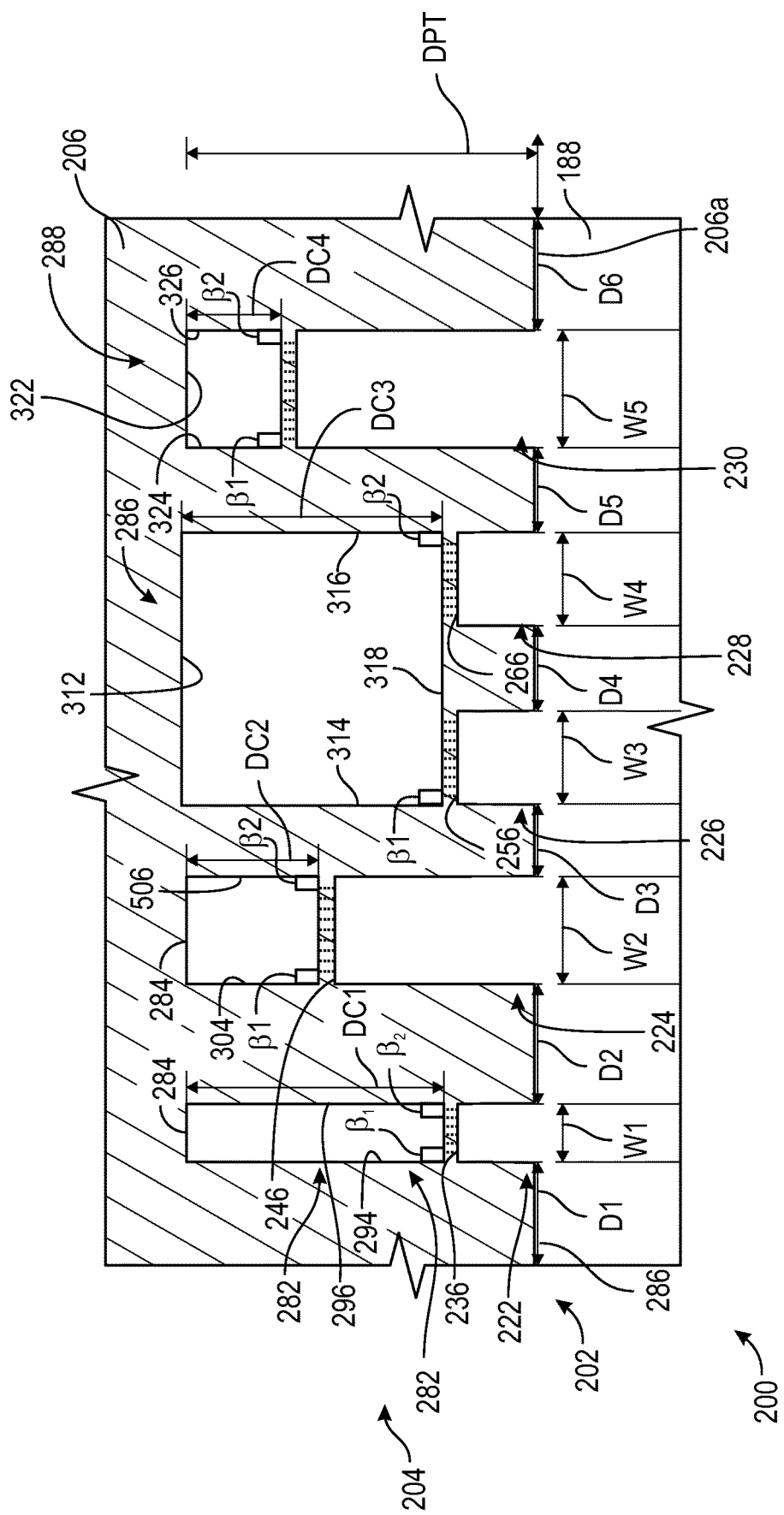
FIG. 6 is a detail view of the exemplary acoustic engine casing for use with the gas turbine engine, which includes the casing treatment and the acoustic treatment, and in which the airfoil has been removed for clarity.

With reference to FIG. 6, the acoustic chambers 282, 284, 286, 288 extend radially from the perforated walls 236, 246, 256, 266, 276 associated with a respective one of the grooves 220. The acoustic chambers 282, 284, 286, 288 are defined through the housing 206 to extend in the radial direction so that a total overall depth DpT of each of the grooves 220 and the associated acoustic chamber 282, 284, 286, 288 is substantially the same. Stated another way, the sum of the depth Dp1, Dp2, Dp3, Dp4, Dp5 of each groove 222, 224, 226, 228, 230 and an acoustic chamber depth Dc1, Dc2, Dc3, Dc4 associated with the respective acoustic chamber 282, 284, 286, 288 is the same. Generally, the acoustic chamber depth Dc1, Dc2, Dc3, Dc4 is based on the depth Dp1, Dp2, Dp3, Dp4, Dp5 of the associated groove 222, 224, 226, 228, 230 such that each of the grooves 222, 224, 226, 228, 230 and the associated acoustic chambers 282, 284, 286, 288 are defined to have the same total overall depth DpT in the housing 206. By maintaining the same total overall depth DpT in the housing 206, the casing treatment 202 is easier to manufacture.

The first acoustic chamber 282 is defined in the housing 206 so as to be proximate, adjacent to or spaced apart from the leading edge 186 of the airfoil 184. In one example, the first acoustic chamber 282 is spaced the distance D1 apart from the leading edge 186 so as to be positioned directly radially above the first groove 222. The first acoustic chamber 282 has the first width W1 in the X-direction. The first acoustic chamber 282 has the acoustic chamber depth Dc1, which is about 17% to about 37% of the meridional tip chord length 193. In this example, the first acoustic chamber 282 is substantially rectangular in cross-section and includes a first leading chamber wall 294 opposite a first trailing chamber wall 296 in the axial or X-direction. The first leading chamber wall 294 and the first trailing chamber wall 296 are interconnected by the first perforated wall 236 and the first terminal wall 292. The first leading chamber wall 294 is spaced apart from the first trailing chamber wall 296 by the first width W1, and the first terminal wall 292 has the first width W1. The first leading chamber wall 294 and the first trailing chamber wall 296 are each defined to extend along an axis that is substantially perpendicular to the first perforated wall 236 and the first terminal wall 292, and substantially parallel to the radial direction R. Stated another way, the first leading chamber wall 294 is defined at a first angle β1 relative to the first perforated wall 236, and the first angle β1 is about 90 degrees. The first trailing chamber wall 296 is defined at a second angle β2 relative to the first perforated wall 236, and the second angle β2 is about 90 degrees. Thus, in this example, the first acoustic chamber 282 is defined so as to be substantially coplanar or aligned with the first groove 222. The first leading chamber wall 294 and the first trailing chamber wall 296 each extend for the acoustic chamber depth Dc1.

The second acoustic chamber 284 is defined in the housing 206 so as to be between the first groove 222 and the third groove 226. In one example, the second acoustic chamber 284 is spaced the distance D2 apart from the first groove 222 and the first acoustic chamber 282 so as to be positioned directly radially above the second groove 224. The second acoustic chamber 284 has the first width W2 in the X-direction. The second acoustic chamber 284 has the acoustic chamber depth Dc2, which is about 5% to about 25% of the meridional tip chord length 193. In this example, the second acoustic chamber 284 is substantially rectangular in cross-section and includes a second leading chamber wall 304 opposite a second trailing chamber wall 306 in the axial or X-direction. The second leading chamber wall 304 and the second trailing chamber wall 306 are interconnected by the second perforated wall 246 and the second terminal wall 302. The second leading chamber wall 304 is spaced apart from the second trailing chamber wall 306 by the second width W2, and the second terminal wall 302 has the second width W2. The second leading chamber wall 304 and the second trailing chamber wall 306 are each defined to extend along an axis that is substantially perpendicular to the second perforated wall 246 and the second terminal wall 302, and substantially parallel to the radial direction R. Stated another way, the second leading chamber wall 304 is defined at the first angle β1 relative to the second perforated wall 246, and the second trailing chamber wall 306 is defined at the second angle β2 relative to the second perforated wall 246. Thus, in this example, the second acoustic chamber 284 is defined so as to be substantially coplanar or aligned with the second groove 224. The second leading chamber wall 304 and the second trailing chamber wall 306 each extend for the acoustic chamber depth Dc2.

The third acoustic chamber 286 is defined in the housing 206 between the second acoustic chamber 284 and the fourth acoustic chamber 288. In one example, the third acoustic chamber 286 is spaced the distance D3 apart from the second groove 224 and the second acoustic chamber 284 so as to be positioned directly radially above the third groove 226 and the fourth groove 228. The third acoustic chamber 286 has a width in the X-direction, which is the sum of the third width W3, the distance D4 and the fourth width W4. The third acoustic chamber 286 has the acoustic chamber depth Dc3, which is about 17% to about 37% of the meridional tip chord length 193. In this example, the third acoustic chamber 286 is substantially rectangular in cross-section and includes a third leading chamber wall 314 opposite a third trailing chamber wall 316 in the axial or X-direction. The third leading chamber wall 314 is coupled to the third perforated wall 256, and the third trailing chamber wall 316 is coupled to the fourth perforated wall 266. An intermediate wall 318 interconnects the third perforated wall 256 and the fourth perforated wall 266. The intermediate wall 318 may or may not include perforations. The third leading chamber wall 314 is spaced apart from the third trailing chamber wall 316 by the width (sum of the third width W3, the distance D4 and the fourth width W4), and the third terminal wall 312 has the width (sum of the third width W3, the distance D4 and the fourth width W4). The third leading chamber wall 314 and the third trailing chamber wall 316 are each defined to extend along an axis that is substantially perpendicular to the third perforated wall 256, the fourth perforated wall 266 and the third terminal wall 312, and substantially parallel to the radial direction R. Stated another way, the third leading chamber wall 314 is defined at the first angle $\beta 1$ relative to the third perforated wall 256, and the third trailing chamber wall 316 is defined at the second angle $\beta 2$ relative to the fourth perforated wall 266. Thus, in this example, the third acoustic chamber 286 is defined so as to be substantially coplanar or aligned with both the third groove 226 and the fourth groove 228. The third leading chamber wall 314 and the third trailing chamber wall 316 each extend for the acoustic chamber depth Dc3.

The fourth acoustic chamber 288 is defined in the housing 206 so as to be between the third acoustic chamber 286 and the trailing edge 188. In one example, the fourth acoustic chamber 288 is spaced the distance D5 apart from the fourth groove 228 and the third acoustic chamber 286 so as to be positioned directly radially above the fifth groove 230. The fourth acoustic chamber 288 has the fifth width W5 in the X-direction. The fourth acoustic chamber 288 has the acoustic chamber depth Dc4, which is about 1% to about 21% of the meridional tip chord length 193. In this example, the fourth acoustic chamber 288 is substantially rectangular in cross-section and includes a fourth leading chamber wall 324 opposite a fourth trailing chamber wall 326 in the axial or X-direction. The fourth leading chamber wall 324 and the fourth trailing chamber wall 326 are interconnected by the fifth perforated wall 276 and the fourth terminal wall 322. The fourth leading chamber wall 324 is spaced apart from the fourth trailing chamber wall 326 by the fifth width W5, and the fourth terminal wall 322 has the fifth width W5. The fourth leading chamber wall 324 and the fourth trailing chamber wall 326 are each defined to extend along an axis that is substantially perpendicular to the fifth perforated wall 276 and the fourth terminal wall 322, and substantially parallel to the radial direction R. Stated another way, the fourth leading chamber wall 324 is defined at the first angle $\beta 1$ relative to the fifth perforated wall 276, and the fourth trailing chamber wall 326 is defined at the second angle $\beta 2$ relative to the fifth perforated wall 276. Thus, in this example, the fourth acoustic chamber 288 is defined so as to be substantially coplanar or aligned with the fifth groove 230. The fourth leading chamber wall 324 and the fourth trailing chamber wall 326 each extend for the acoustic chamber depth Dc4. Generally, the rectangular cross-sections of the groove 222, 224, 226, 228, 230 and acoustic chambers 282, 284, 286, 288 provide for ease of manufacture. The depths Dp1, Dp2, Dp3, Dp4, Dp5 of the associated groove 222, 224, 226, 228, 230 and distance D1-D5 between the grooves 222, 224, 226, 228, 230 minimize aerodynamic penalties, and the acoustic chamber depths Dc1, Dc2, Dc3, Dc4 provide tuning for predetermined acoustic frequencies.

Thus, in this example, the acoustic treatment 204 includes the plurality of acoustic chambers 280, which have the same configuration. In this regard, each of the acoustic chambers 282, 284, 286, 288 have the same substantially rectangular cross-section. It should be noted that in other embodiments, the acoustic treatment 204 may be configured differently to dampen the noise generated by operation of the fan and booster section 102. For example, with reference to FIG. 7, an acoustic treatment 404 is shown for use with the casing treatment 202 for the acoustic engine casing 200. As the acoustic treatment 404 includes components that are the same or similar to components of the acoustic treatment 204 discussed with regard to FIGS. 1-6, the same reference numerals will be used to denote the same or similar components. The casing treatment 202 and the acoustic treatment 404 are each formed within a shroud or housing 406 via casting, machining, additive manufacturing, etc. The housing 406 is an annular strip of metal or metal alloy, which is coupled to the acoustic engine casing 200 via press-fit, mechanical fasteners, etc. It should be noted that in other embodiments, the casing treatment 202 and the acoustic treatment 404 may be formed directly in the acoustic engine casing 200, if desired.

Figure 7:
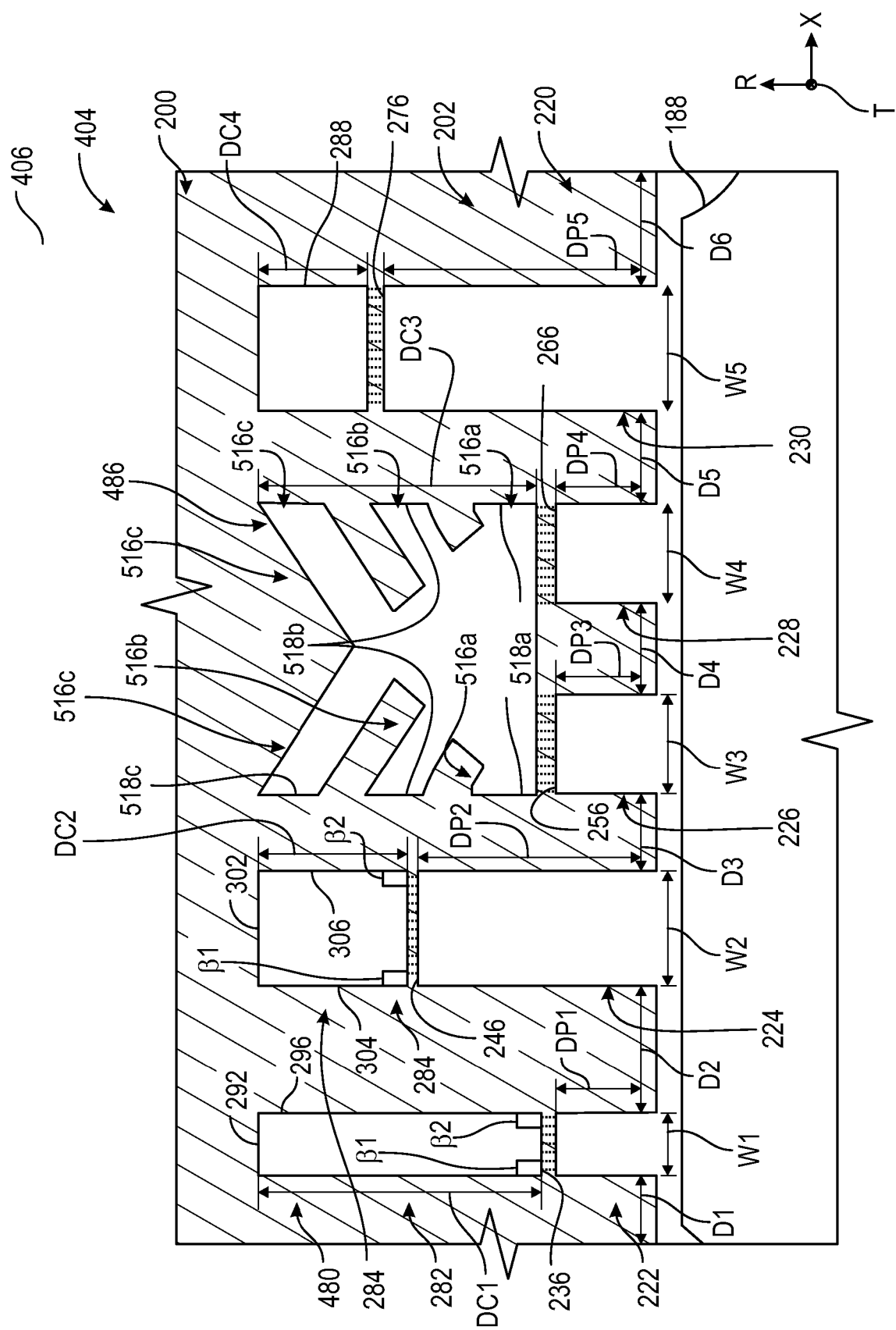
FIG. 7 is a detail view of another exemplary acoustic engine casing for use with the gas turbine engine, which includes the casing treatment and another exemplary acoustic treatment defined in a housing.

In the example of FIG. 7, the acoustic treatment 404 is fluidly coupled to the casing treatment 202 via the perforated walls 236, 246, 256, 266, 276. In one example, the acoustic treatment 404 includes a plurality of acoustic chambers 480, which are defined in a housing 406. In this example, the acoustic chambers 480 include the first acoustic chamber 282, the second acoustic chamber 284, a third acoustic chamber 486 and the fourth acoustic chamber 288. The first acoustic chamber 282 is fluidly coupled to or in fluid communication with the first groove 222 via the first perforated wall 236. The second acoustic chamber 284 is fluidly coupled to or in fluid communication with the second groove 224 via the second perforated wall 246. The third acoustic chamber 486 is fluidly coupled to or in fluid communication with the third groove 226 and the fourth groove 228 via a respective one of the third perforated wall 256 and the fourth perforated wall 266. Thus, in this example, two of the grooves 220, the third groove 226 and the fourth groove 228, are in fluid communication with the same acoustic chamber or are in fluid communication with one or a single acoustic chamber, the third acoustic chamber 486. The fourth acoustic chamber 288 is fluidly coupled to or in fluid communication with the fifth groove 230 via the fifth perforated wall 276.

Generally, the acoustic chambers 480 are defined in the housing 406 so as to be partitioned about a perimeter or circumference of the housing 406. The acoustic treatment 404 includes the plurality of partition walls 290 that divide each of the acoustic chambers 282, 284, 486, 288 into a plurality of discrete sub-chambers that are spaced apart about the perimeter or circumference of the housing 406 by a respective one of the partition walls 290. The partition walls 290 are spaced apart about the perimeter or circumference of the housing 406. Each of the partition walls 290 extend from the respective perforated walls 236, 246, 256, 266, 276 to a respective terminal wall 292, 302, 518c, 322 of the respective acoustic chamber 282, 284, 486, 288. By dividing the acoustic chambers 282, 284, 486, 288 into sub-chambers with the partition walls 290, acoustic performance of the acoustic treatment 404 is improved.

The acoustic chambers 282, 284, 486, 288 extend radially from the perforated walls 236, 246, 256, 266, 276 associated with a respective one of the grooves 220. The acoustic chambers 282, 284, 486, 288 are defined through the housing 406 to extend in the radial direction so that a total overall depth DpT of each of the grooves 220 and the associated acoustic chamber 282, 284, 486, 288 is substantially the same. Stated another way, the sum of the depth Dp1, Dp2, Dp3, Dp4, Dp5 of each groove 222, 224, 226, 228, 230 and an acoustic chamber depth Dc1, Dc2, Dc3, Dc4 associated with the respective acoustic chamber 282, 284, 486, 288 is the same. Generally, the acoustic chamber depth Dc1, Dc2, Dc3, Dc4 is based on the depth Dp1, Dp2, Dp3, Dp4, Dp5 of the associated groove 222, 224, 226, 228, 230 such that each of the grooves 222, 224, 226, 228, 230 and the associated acoustic chambers 282, 284, 486, 288 are defined to have the same total overall depth DpT in the housing 206.

The first acoustic chamber 282 is defined in the housing 406 so as to be proximate, adjacent to or spaced apart from the leading edge 186 of the airfoil 184. The first acoustic chamber 282 is spaced the distance D1 apart from the leading edge 186 so as to be positioned directly radially above the first groove 222. The first acoustic chamber 282 has the first width W1 in the X-direction. The first acoustic chamber 282 includes the first leading chamber wall 294 opposite the first trailing chamber wall 296 in the axial or X-direction. The first leading chamber wall 294 and the first trailing chamber wall 296 are interconnected by the first perforated wall 236 and the first terminal wall 292. The first leading chamber wall 294 is defined at the first angle β1 relative to the first perforated wall 236, and the first trailing chamber wall 296 is defined at the second angle β2 relative to the first perforated wall 236. The first leading chamber wall 294 and the first trailing chamber wall 296 each extend for the acoustic chamber depth Dc1.

The second acoustic chamber 284 is defined in the housing 406 so as to be between the first groove 222 and the third groove 226. In one example, the second acoustic chamber 284 is spaced the distance D2 apart from the first groove 222 and the first acoustic chamber 282 so as to be positioned directly radially above the second groove 224. The second acoustic chamber 284 has the first width W2 in the X-direction. The second acoustic chamber 284 includes the second leading chamber wall 304 opposite the second trailing chamber wall 306 in the axial or X-direction. The second leading chamber wall 304 and the second trailing chamber wall 306 are interconnected by the second perforated wall 246 and the second terminal wall 302. The second leading chamber wall 304 is defined at the first angle β1 relative to the second perforated wall 246, and the second trailing chamber wall 306 is defined at the second angle β2 relative to the second perforated wall 246. The second leading chamber wall 304 and the second trailing chamber wall 306 each extend for the acoustic chamber depth Dc2.

The third acoustic chamber 486 is defined in the housing 406 between the second acoustic chamber 284 and the fourth acoustic chamber 288. In one example, the third acoustic chamber 486 is spaced the distance D3 apart from the second groove 224 and the second acoustic chamber 284 so as to be positioned directly radially above the third groove 226 and the fourth groove 228. The third acoustic chamber 486 has a width in the X-direction, which is the sum of the third width W3, the distance D4 and the fourth width W4. In this example, the third acoustic chamber 486 is substantially fir-tree in cross-section and includes a plurality of branches 516 that extend outwardly from a substantially triangular main chamber 514. The main chamber 514 tapers radially inward from the third perforated wall 256 and the fourth perforated wall 266 to an apex 514a that has a depth that is different and less than the chamber depth Dc3 of the third acoustic chamber 486. In this example, the third acoustic chamber 486 is symmetrical and includes three branches 516a-516c, which each extend outwardly from each side of the main chamber 514. The branch 516c is a terminal wall of the third acoustic chamber 486. Each of the branches 516a-516c terminates in a respective terminal branch end 518a-518c, and the terminal branch ends 518a-518c are aligned along a respective side of the third acoustic chamber 486. In this example, the chamber depth Dc3 is measured from the terminal branch end 518c to the respective one of the third perforated wall 256 and the fourth perforated wall 266. The chamber depth Dc3 is about 17% to about 37% of the meridional tip chord length 193. The intermediate wall 318 interconnects the third perforated wall 256 and the fourth perforated wall 266. The third acoustic chamber 486 has a width (sum of the third width W3, the distance D4 and the fourth width W4) in the axial direction, and the third terminal wall 312 has the width (sum of the third width W3, the distance D4 and the fourth width W4). In this example, the third acoustic chamber 486 is defined so as to be substantially aligned with both the third groove 226 and the fourth groove 228.

The fourth acoustic chamber 288 is defined in the housing 406 so as to be between the third acoustic chamber 486 and the trailing edge 188. In one example, the fourth acoustic chamber 288 is spaced the distance D5 apart from the fourth groove 228 and the third acoustic chamber 486 so as to be positioned directly radially above the fifth groove 230. The fourth acoustic chamber 288 has the fifth width W5 in the X-direction. The fourth acoustic chamber 288 includes the fourth leading chamber wall 324 opposite the fourth trailing chamber wall 326 in the axial or X-direction. The fourth leading chamber wall 324 and the fourth trailing chamber wall 326 are interconnected by the fifth perforated wall 276 and the fourth terminal wall 322. The fourth leading chamber wall 324 is defined at the first angle β1 relative to the fifth perforated wall 276, and the fourth trailing chamber wall 326 is defined at the second angle β2 relative to the fifth perforated wall 276. The fourth leading chamber wall 324 and the fourth trailing chamber wall 326 each extend for the acoustic chamber depth Dc4. The individual branches 516a-516c in the third acoustic chamber 486 may target specific tuning frequencies, particularly at higher frequencies. Thus, in this example, the acoustic treatment 404 includes the plurality of acoustic chambers 480, with the third acoustic chamber 486 having an acoustic configuration that is different than the acoustic configuration of each of the acoustic chambers 282, 284, 288.

Figure 8:
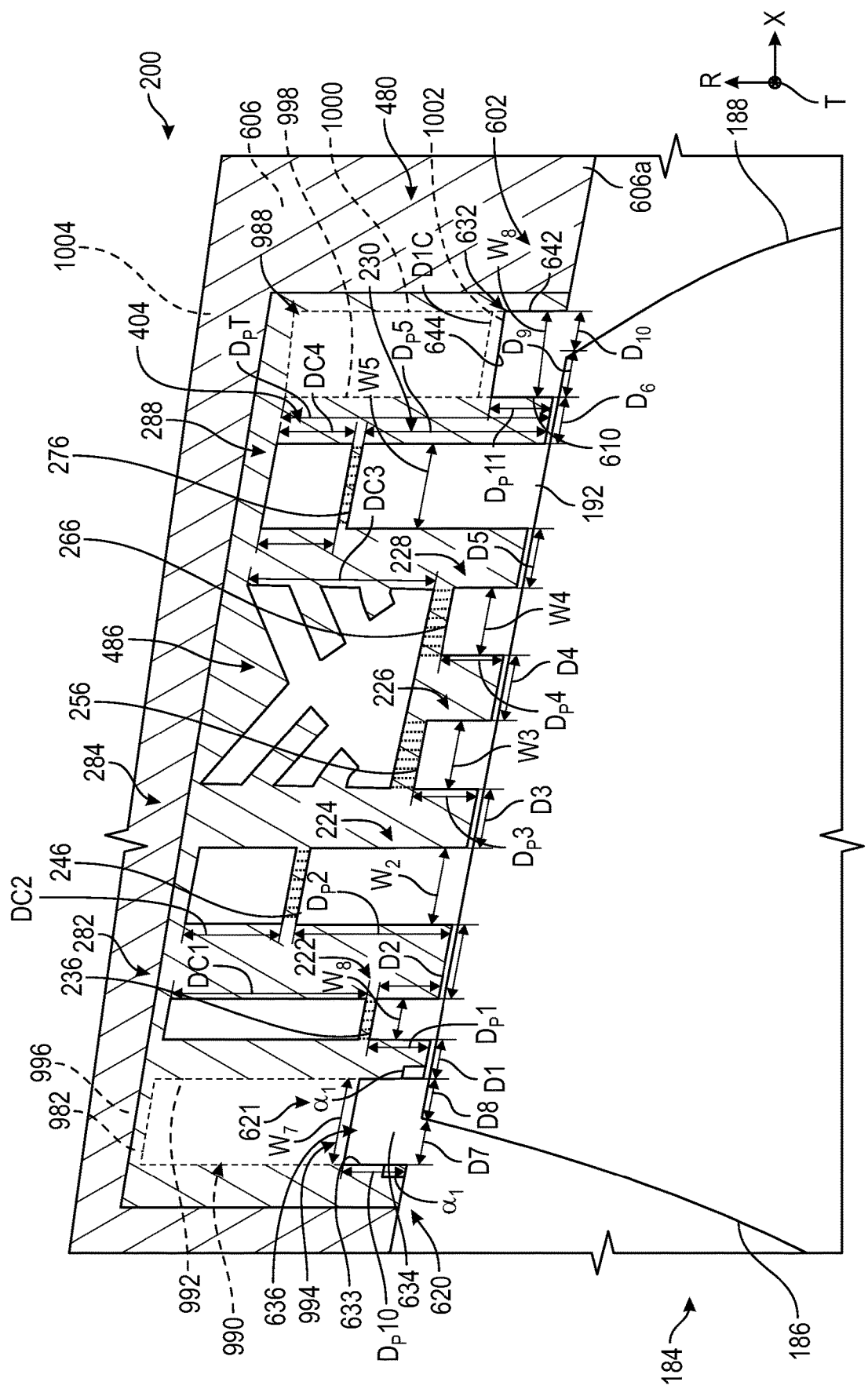
FIG. 8 is a detail view of another exemplary acoustic engine casing for use with the gas turbine engine, which includes another exemplary casing treatment and the acoustic treatment defined in a housing.

It should be noted that in other embodiments, the casing treatment 202 may be configured differently to dampen the noise generated by operation of the fan and booster section 102. For example, with reference to FIG. 8, a casing treatment 602 is shown for use with the acoustic treatment 404 for the acoustic engine casing 200. As the casing treatment 602 and the acoustic treatment 404 include components that are the same or similar to components of the casing treatment 202 and the acoustic treatment 404 discussed with regard to FIGS. 1-7, the same reference numerals will be used to denote the same or similar components. The casing treatment 602 and the acoustic treatment 404 are each formed within a housing 606 via casting, machining, additive manufacturing, etc. The housing 606 is an annular strip of metal or metal alloy, which is coupled to the acoustic engine casing 200 via press-fit, mechanical fasteners, etc. It should be noted that in other embodiments, the casing treatment 202 and the acoustic treatment 404 may be formed directly in the acoustic engine casing 200, if desired.

In this example, the casing treatment 602 is positioned radially outboard of the fan blade 182 and the casing treatment 602 is defined so as to extend in the radial direction. The acoustic treatment 404 is defined radially outboard of the casing treatment 602 and extends in the radial direction. In one example, the casing treatment 602 includes a plurality of casing grooves or grooves 620, which are defined in the housing 606 to extend about a perimeter or circumference of the housing 606. The grooves 620 are defined through an inner surface 606a of the housing 606 and extend radially or in the radial direction from the inner surface 606a. The grooves 620 are defined through the inner surface 606a so as to be proximate or adjacent to the tip 192 of the airfoil 184. Each of the grooves 620 has an inlet or opening defined at the inner surface 606a. In this example, the grooves 620 include a leading groove 621, the first groove 222, the second groove 224, the third groove 226, the fourth groove 228, the fifth groove 230 and a trailing groove 632.

The leading groove 621 is defined in the housing 606 so as to include a portion axially in front of the leading edge 186 and a portion that overlaps the leading edge 186 of the airfoil 184. The leading groove 621 is continuous about the circumference of the housing 606. In one example, the leading groove 621 extends a distance D7 beyond the leading edge 186 and extends for a distance D8 from the leading edge 186 toward the trailing edge 188. The distance D7 is about 0.24 inches (in.) to about 0.38 inches (in.), and the distance D8 is about 0 to about 0.14 inches (in.). The leading groove 621 has a leading width W7, which is defined axially or in the X-direction. The leading width W7 is about 0.38 inches (in.). In this example, the leading groove 621 is substantially U-shaped, and includes a leading first wall 633 opposite a leading second wall 634. The leading first wall 633 and the leading second wall 634 are interconnected by a leading terminal wall 636. The leading first wall 633 is spaced apart from the leading second wall 634 by the leading width W7, and the leading terminal wall 636 has the leading width W7. The leading first wall 633 and the leading second wall 634 are each defined to extend along an axis that is substantially perpendicular to the leading terminal wall 636 and substantially parallel to the radial direction R. Stated another way, the leading first wall 633 and the leading second wall 634 are defined at the first angle α1 relative to the inner surface 606a. The leading first wall 633 and the leading second wall 634 each extend for a leading first depth Dp10. In one example, the leading depth Dp10 is about 33% of the fifth depth Dp5 of the fifth groove 230.

The first groove 222 is defined in the housing 606 so as to be proximate, adjacent to or spaced apart from the leading edge 186 of the airfoil 184, and to be downstream from the leading groove 621. As discussed, the first groove 222 is spaced the distance D1 apart from the leading edge 186 and has the first width W1. The first groove 222 extends for the first depth Dp1. The second groove 224 is downstream of the first groove 222 in a direction of the fluid flowing through the fan rotor 112. The second groove 224 is spaced apart from the first groove 222 by the distance D2 and has the second width W2. The second groove 224 extends for the second depth Dp2. The third groove 226 is downstream of the second groove 224. The third groove 226 is spaced apart from the second groove 224 by the distance D3 and has the third width W3. The third groove 226 extends for the third depth Dp3. The fourth groove 228 is downstream of the third groove 226. The fourth groove 228 is spaced apart from the third groove 226 by the distance D4 and has the fourth width W4. The fourth groove 228 extends for the fourth depth Dp4. The fifth groove 230 is downstream of the fourth groove 228. The fifth groove 230 is spaced apart from the fourth groove 228 by a distance D5 and is defined between the fourth groove 228 and the trailing edge 188 of the airfoil 184. The fifth groove 230 is proximate, adjacent to and spaced the distance D6 apart from the trailing edge 188 and has the fifth width W5. The fifth groove 230 extends for the fifth depth Dp5.

The trailing groove 632 is defined in the housing 606 so as to extend over and beyond the trailing edge 188 of the airfoil 184. Stated another way, the trailing groove 632 has a portion that overlaps the trailing edge 188 and has a portion that extends axially beyond the trailing edge 188. In one example, the trailing groove 632 extends a distance D9 in front of the trailing edge 188 and extends a distance D10 beyond the trailing edge 188. The distance D9 is about 0 to about 0.13 inches (in.), and the distance D10 is about 0.25 inches (in.). The trailing groove 632 has a trailing width W8, which is defined axially or in the X-direction. The trailing width W8 is about 0.383 inches (in.). In this example, the trailing width W8 includes fillets, if any, that are associated with the airfoil 184. The trailing groove 632 is continuous about the circumference of the housing 606. In this example, the trailing groove 632 is substantially U-shaped, and includes a trailing first wall 640 opposite a trailing second wall 642. The trailing first wall 640 and the trailing second wall 642 are interconnected by a trailing terminal wall 644. The trailing first wall 640 is spaced apart from the trailing second wall 642 by the trailing width W8, and the trailing terminal wall 644 has the trailing width W8. The trailing first wall 640 and the trailing second wall 642 are each defined to extend along an axis that is substantially perpendicular to the trailing terminal wall 644 and substantially parallel to the radial direction R. Stated another way, the trailing first wall 640 and the trailing second wall 642 are defined at the first angle α1 relative to the inner surface 606a. The trailing first wall 640 and the trailing second wall 642 each extend for a trailing depth Dp11. In one example, the trailing depth Dp11 is about 33% of the fifth depth Dp5 of the fifth groove 230.

Each of the perforated walls 236, 246, 256, 266, 276 separate the respective groove 222, 224, 226, 228, 230 from the respective acoustic chamber 480, and the acoustic treatment 404 is fluidly coupled to the casing treatment 602 via the perforated walls 236, 246, 256, 266, 276. In one example, the acoustic treatment 404 includes the plurality of acoustic chambers 480, which are defined in the housing 606. In this example, the acoustic chambers 480 include the first acoustic chamber 282, the second acoustic chamber 284, the third acoustic chamber 486 and the fourth acoustic chamber 288. The first acoustic chamber 282 is fluidly coupled to or in fluid communication with the first groove 222 via the first perforated wall 236. The second acoustic chamber 284 is fluidly coupled to or in fluid communication with the second groove 224 via the second perforated wall 246. The third acoustic chamber 486 is fluidly coupled to or in fluid communication with the third groove 226 and the fourth groove 228 via a respective one of the third perforated wall 256 and the fourth perforated wall 266. The fourth acoustic chamber 288 is fluidly coupled to or in fluid communication with the fifth groove 230 via the fifth perforated wall 276.

Generally, the acoustic chambers 480 are defined in the housing 606 so as to be partitioned about a perimeter or circumference of the housing 606. The acoustic treatment 404 includes the plurality of partition walls 290 that divide each of the acoustic chambers 282, 284, 486, 288 into a plurality of discrete sub-chambers that are spaced apart about the perimeter or circumference of the housing 606 by a respective one of the partition walls 290.

The acoustic chambers 282, 284, 486, 288 are defined through the housing 606 to extend in the radial direction so that a total overall depth DpT of the respective one of the grooves 222, 224, 226, 228, 230 and the associated acoustic chamber 282, 284, 486, 288 is substantially the same. Stated another way, the sum of the depth Dp1, Dp2, Dp3, Dp4, Dp5 of each groove 222, 224, 226, 228, 230 and the acoustic chamber depth Dc1, Dc2, Dc3, Dc4 associated with the respective acoustic chamber 282, 284, 486, 288 is the same. Generally, the acoustic chamber depth Dc1, Dc2, Dc3, Dc4 is based on the depth Dp1, Dp2, Dp3, Dp4, Dp5 of the associated groove 222, 224, 226, 228, 230 such that each of the grooves 222, 224, 226, 228, 230 and the associated acoustic chambers 282, 284, 486, 288 are defined to have the same total overall depth DpT in the housing 606.

The first acoustic chamber 282 is defined in the housing 606 so as to be positioned directly radially above the first groove 222. The first acoustic chamber 282 extends for the acoustic chamber depth Dc1. The second acoustic chamber 284 is defined in the housing 606 so as to be between the first groove 222 and the third groove 226. The second acoustic chamber 284 is positioned directly radially above the second groove 224. The second acoustic chamber 284 extends for the acoustic chamber depth Dc2. The third acoustic chamber 486 is defined in the housing 606 between the second acoustic chamber 284 and the fourth acoustic chamber 288. The third acoustic chamber 486 is positioned directly radially above the third groove 226 and the fourth groove 228. In this example, the third acoustic chamber 486 is substantially fir-tree in cross-section, however, the third acoustic chamber 286 may be employed with the casing treatment 602. The third acoustic chamber 486 has a width (sum of the third width W3, the distance D4 and the fourth width W4) in the axial direction and the third acoustic chamber 486 is defined so as to be substantially aligned with both the third groove 226 and the fourth groove 228. The third acoustic chamber 486 has the acoustic chamber depth Dc3. The fourth acoustic chamber 288 is defined in the housing 606 so as to be between the third acoustic chamber 486 and the trailing edge 188. The fourth acoustic chamber 288 is positioned directly radially above the fifth groove 230. The fourth acoustic chamber 288 extends for the acoustic chamber depth Dc4.

Figure 9:
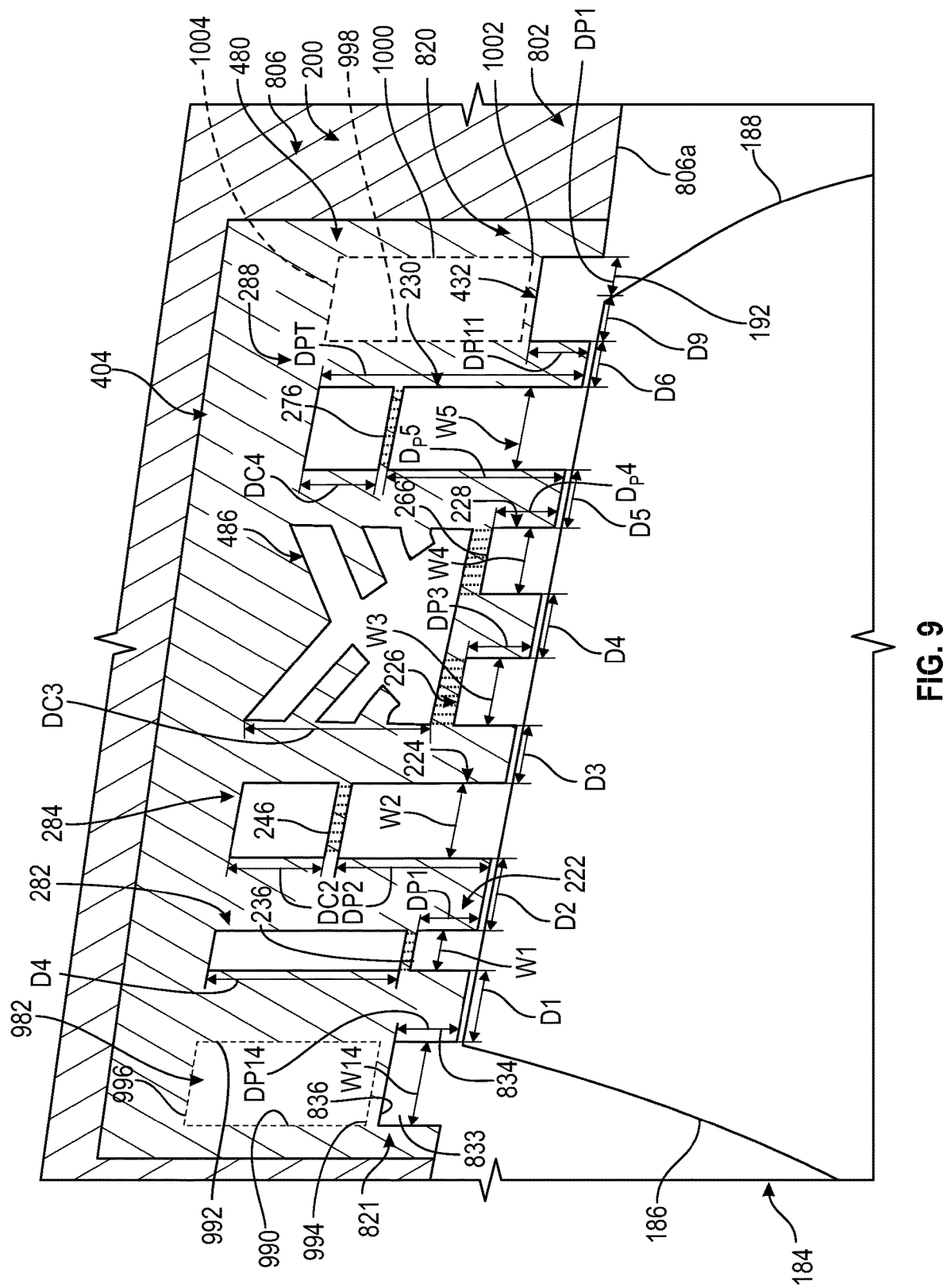
FIG. 9 is a detail view of another exemplary acoustic engine casing for use with the gas turbine engine, which includes another exemplary casing treatment and the acoustic treatment defined in a housing.

It should be noted that in other embodiments, the casing treatment 202 may be configured differently to dampen the noise generated by operation of the fan and booster section 102. For example, with reference to FIG. 9, a casing treatment 802 is shown for use with the acoustic treatment 404 for the acoustic engine casing 200. As the casing treatment 802 and the acoustic treatment 404 include components that are the same or similar to components of the casing treatment 202, the casing treatment 602 and the acoustic treatment 404 discussed with regard to FIGS. 1-8, the same reference numerals will be used to denote the same or similar components. The casing treatment 802 and the acoustic treatment 404 are each formed within a housing 806 via casting, machining, additive manufacturing, etc. The housing 806 is an annular strip of metal or metal alloy, which is coupled to the acoustic engine casing 200 via press-fit, mechanical fasteners, etc. It should be noted that in other embodiments, the casing treatment 802 and the acoustic treatment 404 may be formed directly in the acoustic engine casing 200, if desired.

In this example, the casing treatment 802 is positioned radially outboard of the fan blade 182 and the casing treatment 802 is defined so as to extend in the radial direction. The acoustic treatment 404 is defined radially outboard of the casing treatment 802 and extends in the radial direction. In one example, the casing treatment 802 includes a plurality of casing grooves or grooves 820, which are defined in the housing 806 to extend about a perimeter or circumference of the housing 806. The grooves 820 are defined through an inner surface 806a of the housing 806 and extend radially or in the radial direction from the inner surface 806a. The grooves 820 are defined through the inner surface 806a so as to be proximate or adjacent to the tip 192 of the airfoil 184. Each of the grooves 820 has an inlet or opening defined at the inner surface 806a. In this example, the grooves 820 include a leading groove 821, the first groove 222, the second groove 224, the third groove 226, the fourth groove 228, the fifth groove 230 and the trailing groove 632.

The leading groove 821 is defined in the housing 806 so as to be axially in front of and to terminate at the leading edge 186 of the airfoil 184. The leading groove 821 has a leading width W14, which is defined axially or in the X-direction. The leading width W14 is about 0.38 inches (in.). A substantial majority of the leading width W14 is defined axially in front of or upstream from the leading edge 186. In this example, the leading groove 821 is substantially U-shaped, and includes a leading first wall 833 opposite a leading second wall 834. The leading first wall 833 and the leading second wall 834 are interconnected by a leading terminal wall 836. The leading first wall 833 is spaced apart from the leading second wall 834 by the leading width W14, and the leading terminal wall 836 has the leading width W7. The leading first wall 833 and the leading second wall 834 are each defined to extend along an axis that is substantially perpendicular to the leading terminal wall 836 and substantially parallel to the radial direction R. Stated another way, the leading first wall 833 and the leading second wall 834 are defined at the first angle $\alpha 1$ relative to the inner surface 806a. The leading first wall 833 and the leading second wall 834 each extend for a leading first depth Dp14. In one example, the leading depth Dp14 is about 33% of the fifth depth Dp5 of the fifth groove 230.

The first groove 222 is defined in the housing 806 so as to be proximate, adjacent to or spaced apart from the leading edge 186 of the airfoil 184, and to be downstream from the leading groove 821. As discussed, the first groove 222 is spaced the distance D1 apart from the leading edge 186 and has the first width W1. The first groove 222 extends for the first depth Dp1. The second groove 224 is downstream of the first groove 222 in a direction of the fluid flowing through the fan rotor 112. The second groove 224 is spaced apart from the first groove 222 by the distance D2 and has the second width W2. The second groove 224 extends for the second depth Dp2. The third groove 226 is downstream of the second groove 224. The third groove 226 is spaced apart from the second groove 224 by the distance D3 and has the third width W3. The third groove 226 extends for the third depth Dp3. The fourth groove 228 is downstream of the third groove 226. The fourth groove 228 is spaced apart from the third groove 226 by the distance D4 and has the fourth width W4. The fourth groove 228 extends for the fourth depth Dp4. The fifth groove 230 is downstream of the fourth groove 228. The fifth groove 230 is spaced apart from the fourth groove 228 by a distance D5 and is defined between the fourth groove 228 and the trailing edge 188 of the airfoil 184. The fifth groove 230 is proximate, adjacent to and spaced the distance D6 apart from the trailing edge 188 and has the fifth width W5. The fifth groove 230 extends for the fifth depth Dp5.

The trailing groove 632 is defined in the housing 806 so as to extend over and beyond the trailing edge 188 of the airfoil 184. In one example, the trailing groove 632 extends the distance D9 in front of the trailing edge 188 and extends the distance D10 beyond the trailing edge 188. The trailing groove 632 has the trailing width W8 and has the trailing depth Dp11.

Each of the perforated walls 236, 246, 256, 266, 276 separate the respective groove 222, 224, 226, 228, 230 from the respective acoustic chamber 480, and the acoustic treatment 404 is fluidly coupled to the casing treatment 802 via the perforated walls 236, 246, 256, 266, 276. In one example, the acoustic treatment 404 includes the plurality of acoustic chambers 480, which are defined in the housing 806. In this example, the acoustic chambers 480 include the first acoustic chamber 282, the second acoustic chamber 284, the third acoustic chamber 486 and the fourth acoustic chamber 288. The first acoustic chamber 282 is fluidly coupled to or in fluid communication with the first groove 222 via the first perforated wall 236. The second acoustic chamber 284 is fluidly coupled to or in fluid communication with the second groove 224 via the second perforated wall 246. The third acoustic chamber 486 is fluidly coupled to or in fluid communication with the third groove 226 and the fourth groove 228 via a respective one of the third perforated wall 256 and the fourth perforated wall 266. The fourth acoustic chamber 288 is fluidly coupled to or in fluid communication with the fifth groove 230 via the fifth perforated wall 276.

Generally, the acoustic chambers 480 are defined in the housing 806 so as to be partitioned about a perimeter or circumference of the housing 806. The acoustic treatment 404 includes the plurality of partition walls 290 that divide each of the acoustic chambers 282, 284, 486, 288 into a plurality of discrete sub-chambers that are spaced apart about the perimeter or circumference of the housing 806 by a respective one of the partition walls 290.

The acoustic chambers 282, 284, 486, 288 are defined through the housing 806 to extend in the radial direction so that a total overall depth DpT of the respective one of the grooves 222, 224, 226, 228, 230 and the associated acoustic chamber 282, 284, 486, 288 is substantially the same. Stated another way, the sum of the depth Dp1, Dp2, Dp3, Dp4, Dp5 of each groove 222, 224, 226, 228, 230 and the acoustic chamber depth Dc1, Dc2, Dc3, Dc4 associated with the respective acoustic chamber 282, 284, 486, 288 is the same. Generally, the acoustic chamber depth Dc1, Dc2, Dc3, Dc4 is based on the depth Dp1, Dp2, Dp3, Dp4, Dp5 of the associated groove 222, 224, 226, 228, 230 such that each of the grooves 222, 224, 226, 228, 230 and the associated acoustic chambers 282, 284, 486, 288 are defined to have the same total overall depth DpT in the housing 806.

The first acoustic chamber 282 is defined in the housing 806 so as to be positioned directly radially above the first groove 222. The first acoustic chamber 282 extends for the acoustic chamber depth Dc1. The second acoustic chamber 284 is defined in the housing 806 so as to be between the first groove 222 and the third groove 226. The second acoustic chamber 284 is positioned directly radially above the second groove 224. The second acoustic chamber 284 extends for the acoustic chamber depth Dc2. The third acoustic chamber 486 is defined in the housing 806 between the second acoustic chamber 284 and the fourth acoustic chamber 288. The third acoustic chamber 486 is positioned directly radially above the third groove 226 and the fourth groove 228. In this example, the third acoustic chamber 486 is substantially fir-tree in cross-section, however, the third acoustic chamber 286 may be employed with the casing treatment 802. The third acoustic chamber 486 has a width (sum of the third width W3, the distance D4 and the fourth width W4) in the axial direction and the third acoustic chamber 486 is defined so as to be substantially aligned with both the third groove 226 and the fourth groove 228. The third acoustic chamber 486 has the acoustic chamber depth Dc3. The fourth acoustic chamber 288 is defined in the housing 806 so as to be between the third acoustic chamber 486 and the trailing edge 188. The fourth acoustic chamber 288 is positioned directly radially above the fifth groove 230. The fourth acoustic chamber 288 extends for the acoustic chamber depth Dc4.

Thus, the casing treatment 202, 602, 802 cooperates with the acoustic treatment 204, 404 to reduce noise associated with the operation of the fan and booster section 102, without substantially reducing performance of the fan and booster section 102. By defining the casing treatment 202, 602, 802 with the grooves 220, 620, 820 about the airfoils 184 of the rotor disk 180, the acoustic chambers 280, 480 may be defined as expansion chambers, which attenuates acoustic noise. Generally, due to the high-speed nature of the flow near the tips 192 of the airfoils 184 (FIG. 2), the acoustic chambers 282, 284, 486, 288 are recessed via the grooves 222, 224, 226, 228, 230 to improve aerodynamic performance. The combination of the casing treatment 202, 602, 802 with the acoustic treatment 204, 404 enables the establishment of flow field communication that is in sync to attenuate noise. Generally, the width of the grooves 220, 620, 820 and the acoustic chambers 280, 480 in the streamwise, chordwise or axial direction varies, which also ensures noise attenuation without reducing performance. In addition, by providing the third acoustic chamber 286, 486 with the width, which is larger than the width of the other acoustic chambers 282, 284, 286, the third acoustic chamber 286, 486 is able to attenuate noise over a broader range of frequencies.

In addition, it should be noted that the casing treatments 602, 802 may include acoustic chambers over the leading groove 621, 821 and the trailing groove 632. For example, with reference to FIGS. 8 and 9, a leading acoustic chamber 982 may be defined over the leading groove 621, 821 and a trailing acoustic chamber 988 may be defined over the trailing groove 632 as illustrated in broken lines. The leading acoustic chamber 982 is defined in the housing 606, 806 so as to be upstream from the first acoustic chamber 282. In one example, the leading acoustic chamber 982 is spaced the distance D1 apart from the first acoustic chamber 282 so as to be positioned directly radially above the leading groove 621, 821. The leading acoustic chamber 982 has the seventh width W7 or the sum of the seventh width W7 and the fourteenth width W14 in the X-direction depending upon the respective leading groove 621, 821. The leading acoustic chamber 982 includes a first chamber wall 990 opposite a second chamber wall 992 in the axial or X-direction. The first chamber wall 990 and the second chamber wall 992 are interconnected by a perforated wall 994 and a terminal wall 996. The first chamber wall 990 and the second chamber wall 992 each extend for the acoustic chamber depth Dc1.

The trailing acoustic chamber 988 is defined in the housing 606, 806 so as to be downstream from the fourth acoustic chamber 288. In one example, the trailing acoustic chamber 988 is spaced the distance D6 apart from the fourth acoustic chamber 288 so as to be positioned directly radially above the trailing groove 632. The trailing acoustic chamber 988 has the eighth width W8 in the X-direction. The trailing acoustic chamber 988 includes a first chamber wall 998 opposite a second chamber wall 1000 in the axial or X-direction. The first chamber wall 998 and the second chamber wall 1000 are interconnected by a perforated wall 1002 and a terminal wall 1004. The first chamber wall 998 and the second chamber wall 1000 each extend for the acoustic chamber depth Dc4.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine, comprising:
   a rotatable component defining a rotational axis; and
   an engine casing disposed about the rotatable component, the engine casing including a casing treatment comprising:
     a plurality of grooves each being defined in the engine casing, extending circumferentially around the rotational axis, and having a radial groove depth relative to the rotational axis, wherein the radial groove depth is different for at least two of the grooves,
     a plurality of acoustic chambers each being disposed radially outward relative to the rotational axis and from an associated groove of the plurality of grooves, wherein each acoustic chamber is radially separated from one of the associated grooves by a perforated wall, and wherein the perforated walls have varying radial positions depending on the radial groove depths,
   wherein each acoustic chamber has a radial acoustic chamber depth based on the radial groove depth of the associated groove so that a total depth of each of the plurality of grooves and the associated one of the plurality of acoustic chambers is substantially the same,
   wherein two adjacent grooves of the plurality of grooves are associated with a same single first acoustic chamber of the plurality of acoustic chambers and the first acoustic chamber has an axial width so that the first acoustic chamber extends axially, and radially outward from, both of the two adjacent grooves,
   wherein one of the plurality of grooves axially forward from, and adjacent to, the two grooves is associated with a single second acoustic chamber of the plurality of acoustic chambers,
   wherein another one of the plurality of grooves axially rearward from the two grooves is associated with a single third acoustic chamber of the plurality of acoustic chambers, and
   wherein the second and third acoustic chambers respectively have the same axial width as their associated grooves, and
   a fourth acoustic chamber being radially outward from a forward-most groove of the of the plurality of grooves and having the smallest axial width of any of the other acoustic chambers of the plurality of acoustic chambers.

2. The gas turbine engine of claim 1, wherein the groove depth of the two of the plurality of grooves is the same.

3. The gas turbine engine of claim 1, wherein the rotatable component includes an airfoil having a leading edge and a trailing edge, the plurality of grooves is defined to extend from at least proximate the leading edge to the trailing edge, and the two of the plurality of grooves are defined to be positioned between the leading edge and the trailing edge.

4. The gas turbine engine of claim 3, wherein the plurality of grooves includes a leading groove that terminates at the leading edge.

5. The gas turbine engine of claim 3, wherein the plurality of grooves includes a leading groove that has a portion that overlaps the leading edge.

6. The gas turbine engine of claim 3, wherein the plurality of grooves includes a trailing groove that has a portion that overlaps the trailing edge and a portion that extends axially from the trailing edge.

7. The gas turbine engine of claim 1, wherein the one of the plurality of acoustic chambers has a fir-tree acoustic configuration.

8. The gas turbine engine of claim 1, wherein the second one of the plurality of acoustic chambers has a rectangular cross-section.

9. The gas turbine engine of claim 1, wherein the plurality of grooves includes at least a first groove, a second groove, a third groove, a fourth groove and a fifth groove arranged in a direction of working fluid flow through the rotatable component, each of the plurality of grooves has a width in the direction, and the width of the first groove is a minimum width and the width of the fifth groove is a maximum width.

10. The gas turbine engine of claim 9, wherein the groove depth of the fifth groove is a maximum groove depth, and the groove depth of the first groove, the second groove and the third groove are the same.

11. The gas turbine engine of claim 10, wherein the groove depth of the first groove, the second groove and the third groove are a minimum groove depth.

12. The gas turbine engine of claim 9, wherein the width of each of the third groove and the fourth groove is the same and is different than the width of the second groove.

13. A gas turbine engine, comprising:
a rotatable component that includes an airfoil having a leading edge and a trailing edge; and
an engine casing disposed about the rotatable component, the engine casing including a casing treatment comprising
 a plurality of grooves each being defined in the engine casing, extending circumferentially around the rotational axis, and having a radial groove depth relative to the rotational axis, wherein the radial groove depth is different for at least two of the grooves,
 a plurality of acoustic chambers each being disposed radially outward relative to the rotational axis and from an associated groove of the plurality of grooves, wherein each acoustic chamber is radially separated from one of the associated grooves by a perforated wall, and wherein the perforated walls have varying radial positions depending on the radial groove depths,
 wherein each acoustic chamber has a radial acoustic chamber depth based on the radial groove depth of the associated groove so that a total depth of each of the plurality of grooves and the associated one of the plurality of acoustic chambers is substantially the same,
 wherein two adjacent grooves of the plurality of grooves are associated with a same single first acoustic chamber one of the plurality of acoustic chambers and the first acoustic chamber has an axial width so that the first acoustic chamber extends axially, and radially outward from, both of the two adjacent grooves,
 wherein one of the plurality of grooves axially forward from, and adjacent to, the two grooves is associated with a single second acoustic chamber of the plurality of acoustic chambers,
 wherein another one of the plurality of grooves axially rearward from the two grooves is associated with a single third acoustic chamber of the plurality of acoustic chambers, and
 wherein the second and third acoustic chambers respectively have the same axial width as their associated grooves, and
 a fourth acoustic chamber being radially outward from a forward-most groove of the of the plurality of grooves and having the smallest axial width of any of the other acoustic chambers of the plurality of acoustic chambers.

14. The gas turbine engine of claim 13, wherein the first acoustic chamber has an acoustic configuration that is different than the second acoustic chamber.

15. The gas turbine engine of claim 13, wherein the plurality of grooves includes a leading groove that terminates at the leading edge.

16. The gas turbine engine of claim 13, wherein the plurality of grooves includes a leading groove that has a portion that overlaps the leading edge.

17. The gas turbine engine of claim 13, wherein the plurality of grooves includes a trailing groove that has a portion that overlaps the trailing edge and a portion that extends axially from the trailing edge.

* * * * *